United States Patent
Verna-Ketel et al.

(10) Patent No.: US 12,235,783 B2
(45) Date of Patent: Feb. 25, 2025

(54) BUS TRAINING WITH INTERCONNECTED DICE

(71) Applicant: Micron Technology, Inc., Boise, ID (US)

(72) Inventors: Francesco Douglas Verna-Ketel, Boise, ID (US); Hyun Yoo Lee, Boise, ID (US); Smruti Subhash Jhaveri, Boise, ID (US); John Christopher Sancon, Boise, ID (US); Yang Lu, Boise, ID (US); Kang-Yong Kim, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 102 days.

(21) Appl. No.: 17/823,415

(22) Filed: Aug. 30, 2022

(65) Prior Publication Data

US 2024/0070101 A1   Feb. 29, 2024

(51) Int. Cl.
   *G06F 13/40* (2006.01)
   *G06F 13/16* (2006.01)

(52) U.S. Cl.
   CPC ...... *G06F 13/4027* (2013.01); *G06F 13/1668* (2013.01)

(58) Field of Classification Search
   CPC .................... G06F 13/4027; G06F 13/1668
   See application file for complete search history.

(56) References Cited

U.S. PATENT DOCUMENTS

| | | | |
|---|---|---|---|
| 2017/0110169 A1* | 4/2017 | Kim | G06F 13/1689 |
| 2017/0358327 A1* | 12/2017 | Oh | G11C 5/02 |
| 2018/0121123 A1* | 5/2018 | Morris | G06F 3/0604 |
| 2020/0075069 A1* | 3/2020 | Kim | G11C 5/04 |
| 2020/0110716 A1* | 4/2020 | Mozak | G06F 13/1694 |
| 2024/0070102 A1 | 2/2024 | Lu et al. | |

OTHER PUBLICATIONS

"Non-Final Office Action", U.S. Appl. No. 17/823,423, filed Jun. 6, 2024, 11 pages.
"Notice of Allowance", U.S. Appl. No. 17/823,423, 7 pages.

* cited by examiner

*Primary Examiner* — Nimesh G Patel
(74) *Attorney, Agent, or Firm* — Colby Nipper PLLC

(57) ABSTRACT

Described apparatuses and methods facilitate bus training with multiple dice, such as multiple memory dice. A controller can communicate with multiple dice over a bus to perform bus training by sending a test pattern and receiving in return a feedback pattern indicative of the bits detected by the dice. Because suitable signal timing can differ between dice, even those using the same bus, the controller may attempt to train each die separately from the others. In some situations, however, individualized training may be infeasible. To accommodate such situations, logic associated with two or more dice can combine the bits as detected from the test pattern into a combined feedback pattern. A timing parameter that is jointly suitable for multiple dice can be determined, and the bus training may be concluded, responsive to the combined feedback pattern matching the test pattern. The multiple dice may be stacked or linked.

50 Claims, 16 Drawing Sheets

BUS TRAINING WITH INTERCONNECTED DICE

BACKGROUND

Computers, smartphones, and other electronic devices rely on processors and memories. A processor executes code based on data to run applications and provide features to a user. The processor obtains the code and the data from a memory. The memory in an electronic device can include volatile memory (e.g., random-access memory (RAM)) and nonvolatile memory (e.g., flash memory). Like the number of cores or speed of a processor, a rate at which data can be accessed, as well as delays in accessing it, can impact the performance of an electronic device. This performance impact increases as processors are developed that execute code faster and as applications on electronic devices operate on increasingly larger data sets that require ever-larger memories.

BRIEF DESCRIPTION OF THE DRAWINGS

Apparatuses of and techniques for training a bus with interconnected dice are described with reference to the following drawings. The same numbers are used throughout the drawings to reference like features and components:

FIGS. 6-1 and 6-2 illustrate example architectures for bus training with interconnected dice, which architectures can include at least two memory dice that share a bus and are coupled together by another bus;

FIGS. 10-1 and 10-2 jointly illustrate an example timing diagram for entering a bus training mode;

FIGS. 11-1 and 11-2 jointly illustrate an example timing diagram for exiting a bus training mode;

DETAILED DESCRIPTION

Overview

Figure 1:
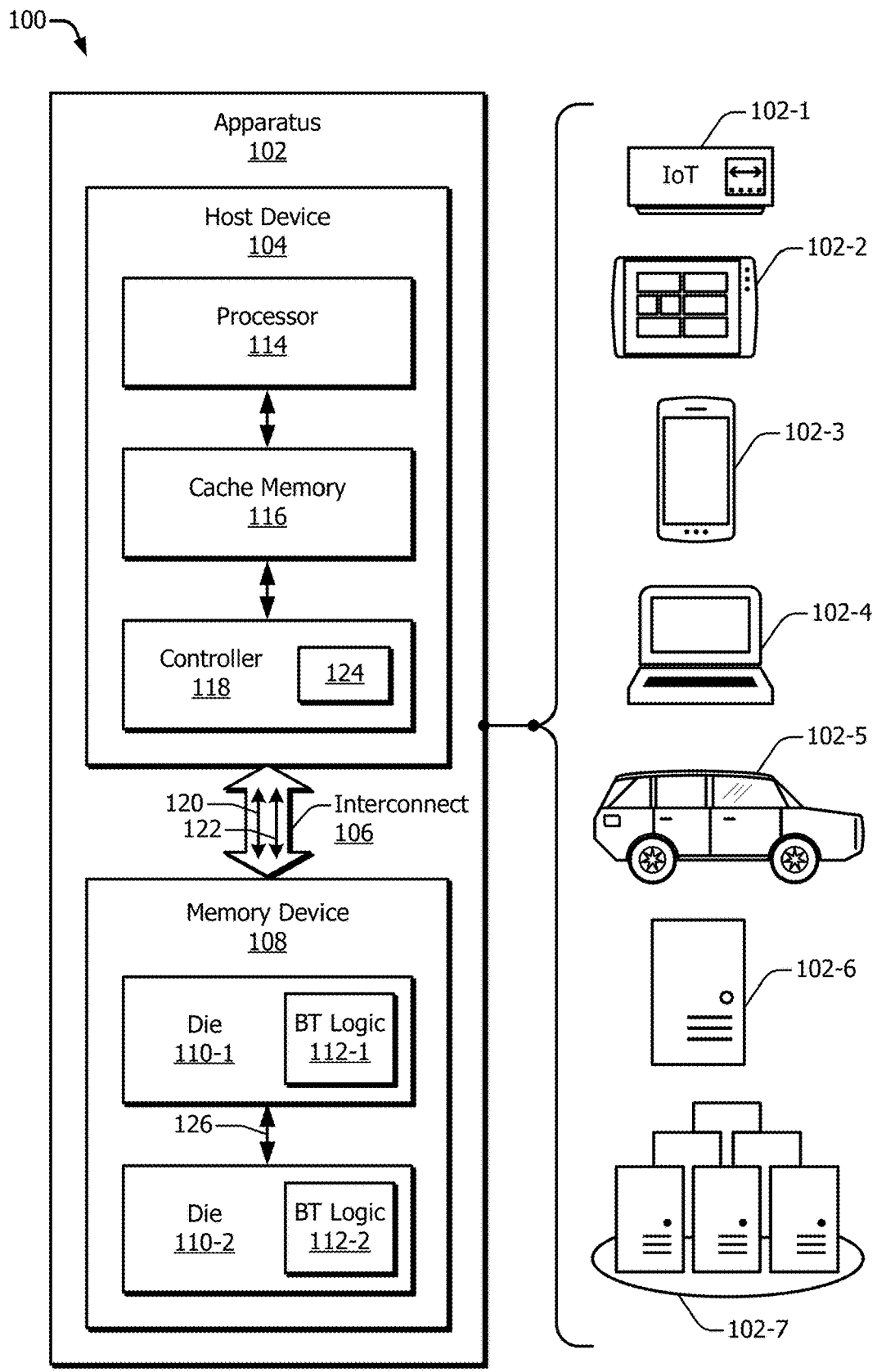
FIG. 1 illustrates example apparatuses that can implement bus training with interconnected dice.

A memory device may have an interconnected die architecture (e.g., a stacked or linked die architecture). This architecture uses at least one set of interconnected dice (or dies). The interconnected dice can include at least one interface die that is connected "internally" to at least one linked die within a package that houses two or more dice. The multiple dice can be coupled to a controller, such as a memory controller, via an interconnect that includes a command bus and a data bus. In some cases, the interface die and the linked die share access to the command bus, which may be realized as a command and address bus. Regarding the data bus, however, in certain aspects the interface die has "direct" access, but the linked die communicates data to and from the data bus "indirectly" via the interface die. The linked die can therefore use a second data bus to send data to and receive data from the interface die.

In certain scenarios, it can be challenging to train the multiple dice relative to using the command bus due to the interconnected die architecture. This document describes techniques to address these challenges by transmitting information that provides bus training feedback with a combination of bits detected by the linked die and the interface die. By selectively combining into the feedback information bits corresponding to each of the multiple dice, the multiple dice can be trained for a common bus even though they are in an interconnected die architecture. Further, the interconnected dice can be trained together instead of sequentially. Additionally or alternatively, the interconnected dice can be trained without instructing a die to refrain from participating in a bus training process, which is called masking a die. By avoiding masking a die, such described techniques can provide bus-training compatibility with memory systems that, for example, are unable to utilize multi-purpose commands (MPCs) during a bus training procedure. Examples of techniques and features for bus training with interconnected dice are described further below.

Generally, processors and memory work in tandem to provide features to users of computers and other electronic devices. An electronic device can provide enhanced features, such as high-resolution graphics or artificial intelligence, as a processor and memory operate more quickly together in a complementary manner. Some applications, like those for AI analysis and virtual-reality graphics, can also demand ever-greater amounts of memory. These applications use increasing amounts of memory to more accurately model and mimic human thinking and the physical world.

Processors and memories can be secured to a printed-circuit board (PCB), such as a rigid or flexible motherboard. The PCB can include sockets for accepting at least one processor and one or more memories. Wiring infrastructure that enables communication between two or more components can also be disposed on at least one layer of the PCB. The PCB, however, provides a finite area for the sockets and the wiring infrastructure. Some PCBs include multiple sockets that are each shaped as a linear slot and designed to accept a double-inline memory module (DIMM). These sockets can be fully occupied by DIMMs while a processor is still able to utilize more memory. In such situations, the system is capable of greater performance if additional memory were available to the processor.

Printed circuit boards may also include at least one peripheral component interconnect (PCI) express (PCI Express®) (PCIe or PCI-E) slot. A PCIe slot is designed to provide a common interface for various types of components that may be coupled to a PCB. Compared to some older standards, PCIe can provider higher rates of data transfer or a smaller footprint on the PCB, including both greater speed and smaller size. Accordingly, certain PCBs enable a processor to access a memory device that is connected to the PCB via a PCIe slot.

In some cases, accessing a memory solely using a PCIe protocol may not offer as much functionality, flexibility, or reliability as is desired. In such cases, another protocol may be layered on top of the PCIe protocol. An example of another, higher-level protocol is the Compute Express Link™ (CXL) protocol. The CXL protocol can be implemented over a physical layer that is governed by the PCIe protocol. The CXL protocol can provide, for instance, a memory-coherent interface that offers high-bandwidth or low-latency data transfers, including data transfers having both higher bandwidth and lower latency.

The CXL protocol addresses some of the limitations of PCIe links by providing an interface that leverages, for example, the PCIe 5.0 physical layer and electricals, while providing lower-latency paths for memory access and coherent caching between processors and memory devices. It offers high-bandwidth, low-latency connectivity between host devices (e.g., processors, CPUs, SoCs) and memory devices (e.g., accelerators, memory expanders, memory buffers, smart input/output (I/O) devices). The CXL protocol also addresses growing high-performance computational workloads by supporting heterogeneous processing and memory systems with potential applications in artificial intelligence, machine learning, communication systems, and other high-performance computing. With the potential to increase memory density by utilizing improved communication protocols, such as CXL, memory devices may be specified with additional design constraints that create new challenges for designers of memory devices.

Thus, memory devices may be implemented in different forms and deployed in various environments. For example, memory dice can be secured to a PCB of a motherboard (directly or as part of a DIMM) or can be enclosed within a CXL memory module. Consider, for instance, double data rate synchronous dynamic random-access memory (DDR SDRAM), including low-power DDR (LPDDR) SDRAM, such as LPDDR5. With the LPDDR5 standard, for instance, memory density may be so high that multiple dice are packaged together—e.g., in an integrated circuit package. In some of such dice packages, at least one die may not have direct access to one or more of the pins of the package that provide an interface to an exterior interconnect. Examples of such architectures are described next.

The many different formats of memory, such as an LPDDR5 DIMM or a CXL memory module, may include multiple dice. The multiple dice that are packaged together may form a memory device with an interconnected die architecture (e.g., a stacked-die architecture or a linked-die architecture). An interconnected-die memory device includes at least one set of interconnected dice, such as an interface die and a linked die. Although described herein primarily in terms of interconnected dice that are packaged together, interconnected dice may instead be packaged separately. The interface die can "directly" send data to or receive data from a memory controller or other component over a data bus of an interconnect. In contrast, the linked die "indirectly" sends data to or receives data from the memory controller or other component through the interface die using a second bus, which may be a data bus that is internal to a package including the dice. Explained another way, the interface die can act as an interface with respect to data being passed between the linked die and the memory controller on a data bus that is coupled between the interface die and the memory controller. The interface and linked dice, however, may share joint access to a command bus, an address bus, or a combination thereof (e.g., a command address bus or a command and address bus). Alternatively, the interface die may act as an interface for the linked die with respect to a command/address bus that propagates command or address information. In some of such cases, the two dice may share joint access to a data bus.

When two entities, such as a memory controller and a memory device, communicate across a bus or interconnect, a first entity signals to a second entity using a voltage and/or a current driven on an electrical conductor. Some period of time elapses for the voltage or current value of the signal to propagate along the bus from the first entity to the second entity. Another time period elapses for the signal to affect circuitry at the second entity to an extent that the circuitry can detect the voltage or current value as information. Such information can be realized as one or more bits representing, for example, a command, an address, or data (e.g., a datum or data item). Typically, the voltage or current value is valid for a finite period of time. If the second entity fails to latch, secure, or otherwise detect the voltage or current during a suitable timeframe window in which the information is valid, the second entity can obtain incorrect information. Accordingly, there is a timing aspect associated with correctly receiving a signal over a bus.

Establishing a timing parameter for correctly receiving signaling over a bus is called bus training (BT). This document addresses, at least in part, bus training with interconnected dice. Consider bus training in which a memory controller is transmitting a signal, and a memory device is receiving the signal. Further, assume that a command bus, for instance, is being trained. To perform command bus training (CBT) in this scenario, the memory controller transmits a signal having multiple bits as a test pattern on the command bus to the memory device. The memory device detects the multiple-bit signal according to a first timing parameter.

In response to the test pattern, as part of the CBT procedure, the memory device transmits the detected values of the multi-bit signal as a feedback pattern to the memory controller over a data bus to provide feedback for the CBT analysis. If the detected values as included in the feedback pattern match the bit values of the test pattern as transmitted, the memory controller can instruct the memory device to lock in the first timing parameter for receiving on the command bus. On the other hand, if the two sets of values or patterns do not match, the memory controller can repeat the testing and feedback process with the memory device using a different, second timing parameter and one or more test patterns. The CBT procedure can continue until a suitable timing parameter is ascertained. It should be understood that the process can be more complex. For example, to fully determine a suitable timing parameter, the memory controller may transmit various bit patterns to ensure that the current timing parameter works with a variety of multi-bit signals.

In one approach to training a bus, including command bus training, each die of multiple interconnected dice can be individually trained with respect to the bus by excluding one or more other dice of the multiple interconnected dice from the training process. The other die (or dice) can be excluded by causing the other die to be masked. Thus, the other die can refrain from receiving an incoming training communication or at least decline to respond to the training communication based on a masking instruction. The masking instruction can be implemented using, e.g., a multi-purpose command (MPC).

The memory controller sends an MPC to the memory device instructing at least one die to be masked. The MPC may correspond, for instance, to a select-die access (SDA) command. The masked die refrains from responding to a bus-training test pattern, but the non-masked die returns feedback information responsive to the bus-training test pattern for the bus training process. In some situations, however, MPCs may not be available. For example, some memory systems or standards may not support an MPC. Alternatively, even if the relevant memory standard does support MPCs generally, MPCs may not be available in a relevant operational mode or scenario. For instance, during initialization, a physical (PHY) layer or PHY chip may not support the issuing of MPCs. Accordingly, a memory controller or memory system may not be able to rely, with certainty, on the availability of multi-purpose commands for bus training. Without a reliable technique for bus training, memory dice or an entire memory system may malfunction and/or produce data errors.

In another approach to training a bus, which approach may omit use of an MPC, multiple dice can be trained jointly or at least partially simultaneously. The multiple dice can include multiple interconnected dice, such as at least one interface die and at least one linked die. In example implementations, the memory controller transmits a signal test pattern on a bus, such as a command bus. In the examples described here, the command bus is common to the interface die and the linked die, so the interface die and the linked dice can each "directly" access the signal test pattern without obtaining the test pattern through another die. Each of the interface and linked dice latch a detected version of the signal test pattern, with each detected version including multiple bits. At least a portion of the detected bits are to be sent to the memory controller as feedback information for the bus training procedure.

In contrast with the command bus, for the primary examples described in this subsection, each of the interface die and the linked die do not have direct access to the data bus that is coupled to the memory controller. This data bus may be an "external" data bus for the multiple interconnected dice relative to a package containing the multiple dice. The interface die and the linked die can be coupled together, however, using a second or an "internal" data bus. Thus, the interface die can directly access the data bus, and the linked die can indirectly access the data bus via the interface die using the internal data bus. To provide joint feedback for the bus training procedure, at least a portion of the command bus bits that are detected by the linked die and at least a portion of the command bus bits that are detected by the interface die are combined. For example, for a seven-bit command bus, four bits from the detected command bus bits of the linked die can be combined with three bits from the detected command bus bits of the interface die to produce combined bits that are "jointly" detected on the command bus. The combined bits can thus provide a joint feedback pattern for multiple dice in the bus training procedure. In some cases, the bits can be combined using a pseudo-random technique or mechanism. Logic that implements the pseudo-random bit-combining may be part of the linked die, the interface die, another die, or separate from an interconnected die (e.g., disposed on a PCB).

Thus, the combined detected bits provide some feedback information regarding suitable timing for the linked die and some feedback information regarding suitable timing for the interface die. The interface die transmits the combined detected bits to the memory controller over the external data bus. Consequently, the PHY layer or chip, which may be coupled between the memory controller and the interface die, can receive a common bus training margin between, or relative to, the linked die and the interface die "automatically" in this manner. The memory controller can, for instance, interpret the combined detected bits as if they are detected bits from a single die. As such, the memory controller can test various signal patterns and timing parameters and change them based on whether the combined detected feedback bits match the transmitted test bits.

Accordingly, in some aspects, a memory controller can train a bus with respect to multiple memory dice, including multiple interconnected memory dice, using a same procedure that may be effective for training a bus with respect to a single memory die. Additionally, the bus training may be achieved without masking dice. Further, the bus training procedure can be accomplished without relying on an MPC, such as an SDA command. Described techniques can therefore be used to perform bus training even if MPCs are not available, or merely may not be available depending on an operating environment or a current operational mode (e.g., during initialization) of the memory system. In some implementations, memory-controller and/or PHY components that can achieve or comport with an LP5(x) compatibility mode can train a bus with respect to multiple interconnected dice without specialized circuitry.

Although some implementations are described above in terms of a memory controller and a memory device performing certain bus training techniques with regard to a command bus, other (e.g., non-memory) device or die types may alternatively perform the techniques with other bus types. Examples of non-memory device and die implementations are described further herein.

Example Operating Environments

FIG. 1 illustrates, at 100 generally, example apparatuses 102 that can implement bus training with interconnected dice. The apparatus 102 can be realized as, for example, at least one electronic device. Example electronic-device implementations include an internet-of-things (IoTs) device 102-1, a tablet device 102-2, a smartphone 102-3, a notebook computer 102-4 (or a desktop computer), a passenger vehicle 102-5 (or other vehicle), a server computer 102-6, a server cluster 102-7 that may be part of cloud computing infrastructure or a data center, and any portion thereof (e.g., a printed circuit board (PCB) or module component of a device).

Other examples of the apparatus 102 include a wearable device, such as a smartwatch or intelligent glasses; an entertainment device, such as a set-top box or streaming dongle, a smart television, a gaming device, or virtual reality (VR) goggles; a motherboard or blade of a server; a consumer appliance; a vehicle or drone, or the electronic components thereof; industrial equipment; a security or other sensor device; and so forth. Each type of electronic device or other apparatus can include one or more components to provide some computing functionality or feature that is enabled or enhanced by the hardware or techniques that are described herein.

In example implementations, the apparatus 102 can include at least one host device 104, at least one interconnect 106, and at least one memory device 108. The host device 104 can include at least one processor 114, at least one cache memory 116, and at least one controller 118. The memory device 108 may include at least one die 110, such as a first die 110-1 and a second die 110-2. Each die 110 may include at least one memory (not explicitly shown in FIG. 1). The memory device 108 or the memory thereof may be realized with one or more memory types.

The memory of the memory device 108 may be realized, for example, with a dynamic random-access memory (DRAM) die or module, including with a three-dimensional (3D) stacked DRAM device, such as a high bandwidth memory (HBM) device or a hybrid memory cube (HMC) device. DRAM may include, for instance, synchronous DRAM (SDRAM) or double data rate (DDR) DRAM (DDR DRAM). The memory of the memory device 108 may also be realized using static random-access memory (SRAM). Thus, the memory device 108 may operate as a main memory or a cache memory, including as both. Additionally or alternatively, the memory device 108 may operate as storage memory. In such cases, the memory may be realized, for example, with a storage-class memory type, such as one employing 3D XPoint™ or phase-change memory (PCM), flash memory, a magnetic hard disk, or a solid-state drive (e.g., a Non-Volatile Memory Express® (NVMe®) device).

Regarding the host device 104, the processor 114 can be coupled to the cache memory 116, and the cache memory 116 can be coupled to the controller 118. The processor 114 can also be coupled to the controller 118 directly (e.g., without going through a cache memory) or indirectly (e.g., via the cache memory 116 as depicted). The host device 104 may include other components to form, for instance, a system-on-a-chip or a system-on-chip (SoC). The processor 114 may include or comprise a general-purpose processor, a central processing unit (CPU), a graphics processing unit (GPU), a neural network engine or accelerator, an application-specific integrated circuit (ASIC), a field-programmable gate array (FPGA) integrated circuit (IC), a communication processor (e.g., a modem or baseband processor), an SoC, and so forth.

In operation, the controller 118 (e.g., a memory controller) can provide a high-level or logical interface between the processor 114 and at least one memory device, such as a memory that is external to the host device 104. The controller 118 can, for example, receive memory requests from the processor 114 and provide the memory requests to an external memory (e.g., a memory device 108) with appropriate formatting, packaging, timing, reordering, and so forth. The controller 118 can forward to the processor 114 responses to the memory requests that the controller 118 receives from the external memory.

The controller 118 may communicate with multiple memory devices, or other types of devices—some of which may include one or more memory components. The controller 118 may also communicate with multiple memory or other devices over one or more interconnects, such as the interconnect 106. Regarding connections that are external to the host device 104, the host device 104 can be coupled to the memory device 108 via the interconnect 106. The memory device 108 may be coupled to, or may include, a main memory or a storage memory, including both in some cases. Another device, such as a cache memory or a switch, may be coupled between the host device 104 and the memory device 108 and may be part of or separate from the interconnect 106.

The depicted interconnect 106, as well as other interconnects (not shown) that communicatively couple together various components, enables data to be transferred between two or more components of the various components. Interconnect examples include a bus, a switching fabric, a crossbar, one or more wires that carry voltage or current signals, and so forth. Each interconnect may be implemented as a unidirectional interconnect or a bidirectional interconnect. The interconnect 106 can be implemented as a parallel propagation pathway. For example, the interconnect 106 can include at least one command bus 120 (or command and address bus 120) and at least one data bus 122, each of which carries multiple bits of a particular item of information (e.g., a data byte) substantially simultaneously. As used herein, the multiple bits can be transmitted substantially simultaneously if, for example, the bits are communicated within a given clock period or half period, even if the individual bits are intentionally or inadvertently staggered slightly within the clock period or half period.

Alternatively, the interconnect 106 can be implemented as a serial propagation pathway that carries one bit of a particular item of information each clock cycle. For instance, the interconnect 106 can comport with a PCIe standard, such as version 4, 5, 6, or a future version. The interconnect 106 may include multiple serial propagation pathways, such as multiple lanes in a PCIe implementation.

The components of the apparatus 102 that are depicted in FIG. 1 represent an example computing architecture that may include a hierarchical memory system. A hierarchical memory system can include memories at different levels, with each level having a memory with a different speed, capacity, or volatile/nonvolatile characteristic. Thus, the memory device 108 may be described in terms of forming at least part of a main memory of the apparatus 102. The memory device 108 may, however, form at least part of a cache memory, a storage memory, an SoC, and so forth of an apparatus 102.

Although various implementations of the apparatus 102 are depicted in FIG. 1 and described herein, an apparatus 102 can be implemented in alternative manners. For example, the host device 104 may include multiple cache memories, including multiple levels of cache memory, or may omit a cache memory. A memory, such as the memory device 108, may have a respective "internal" or "local" cache memory (not shown). In some cases, the host device 104 may omit the processor 114 and/or include other logic. Generally, the illustrated and described components may be implemented in alternative ways, including in distributed or shared memory systems. A given apparatus 102 may also include more, fewer, or different components than those depicted in FIG. 1 or described herein.

The host device 104 and any of the various memories may be realized in multiple manners. In some cases, the host device 104 and the memory device 108 may be located on separate blades or racks, such as in a server or data center computing environment. In other cases, the host device 104 and the memory device 108 can both be disposed on, or physically supported by, a same printed circuit board (PCB) (e.g., a rigid or flexible motherboard or PCB assembly). The host device 104 and the memory device 108 may also be integrated on a same IC or fabricated on separate ICs but packaged together.

A memory device 108 may also be coupled to multiple host devices 104 via one or more interconnects 106 and may be able to respond to memory requests from two or more of the multiple host devices 104. Each host device 104 may include a respective controller 118, or the multiple host devices 104 may share a common controller 118. An example computing system architecture with at least one host device 104 that is coupled to a memory device 108 is described below with reference to FIG. 2.

With continuing reference to FIG. 1, however, the host device 104 and the memory device 108 can perform a bus training procedure. For example, the controller 118 can train at least one die 110 of the memory device 108 with respect to the command bus 120 or the data bus 122. In some implementations, to support the bus training, the controller 118 includes bus training logic 124, and the memory device 108 includes bus training logic 112 (BT logic 112). Each respective die 110 can include a respective instance of bus training logic 112. As shown, the first die 110-1 includes first bus training logic 112-1, and the second die 110-2 includes second bus training logic 112-2. Nonetheless, the bus training logic 112 of the memory device 108 may be distributed differently and/or may have a different quantity of instances of the logic.

Generally, the command bus 120 can be coupled to each die 110 or fewer than all the dice of the memory device 108. Similarly, the data bus 122 can be coupled to each die 110 or fewer than all the dice of the memory device 108. Two or more dice of the memory device 108 may also be coupled together via at least one "internal" bus, such as the bus 126. Here, the bus 126 is not directly exposed to an interface (e.g., not directly coupled to pins or other contacts) of the memory device 108 or to the connections of the interconnect 106.

In certain implementations, the dice 110-1 and 110-2 are each coupled to the command bus 120 without using another die (e.g., the dice may be "directly coupled" as used herein). In contrast, the first die 110-1 is directly coupled to the data bus 122, but the second die 110-2 is indirectly coupled to the data bus 122. More specifically, in these "indirectly-coupled" data-bus implementations, the second die 110-2 can communicate with the data bus 122 via the "internal" bus 126 using the first die 110-1. In such cases, the bus 126 may be realized as a second data bus of the memory system. Examples of this architecture are described below with reference to FIGS. 3, 4, 5, 6-1, 6-2, and 7.

In a bus training procedure, the bus training logic 124 transmits a test pattern over a bus, such as the command bus 120, to the memory device 108. Generally, each die 110 can have a sufficiently different hardware structure with respect to a bus such that signal propagation delays may deviate for each die along the bus. Consequently, a suitable timing parameter for each die 110 may be different or limited. Additionally or alternatively, a timing parameter that is suitable for a die in one memory system may not be suitable for the corresponding die in another memory system. To determine suitable respective timing parameters across multiple dice, some approaches for bus training communicate with each die individually by masking one or more other dice that share the same bus. This can be problematic, however, if a component or a mode of operation limits the ability to mask a die. For example, during initialization with some LPDDR5-based memory systems, multi-purpose commands (MPCs), including a command to mask a die, can be unavailable.

To address such situations, in example implementations, the bus training logic 112 enables the bus training logic 124 to perform bus training "simultaneously" on multiple dice 110-1 and 110-2 without necessarily deviating from a process that trains a single die for bus utilization. To do so, an instance of the bus training logic 112 combines bits detected by each of multiple dice, such as the first and second dice 110-1 and 110-2. The detected bits correspond to the test pattern transmitted by the bus training logic 124 of the controller 118, but the detected bits may not match the test bits due to an unsuitable timing parameter. The combined bits correspond to a joint feedback pattern that represents the bits as detected by the memory device from the perspective of multiple dice.

Thus, a portion of the bits as detected by the first die 110-1 and a portion of the bits as detected by the second die 110-2 are selected by an instance of the bus training logic 112. These bits may be selected based on a pseudo-random technique. The bus training logic 112 combines the selected bits into a multi-die feedback pattern. The bus training logic 112 transmits the combined feedback bits as the feedback pattern to the bus training logic 124 of the controller 118 over the interconnect 106 (e.g., over the data bus 122). The bus training logic 124 can compare the transmitted test pattern to the joint feedback pattern. This analysis can result in a new timing parameter being used for a next test pattern round. Once the feedback pattern, which represents bit detections by multiple dice, matches the test pattern, the current or associated timing parameter can be established for use by the multiple dice.

Figure 2:
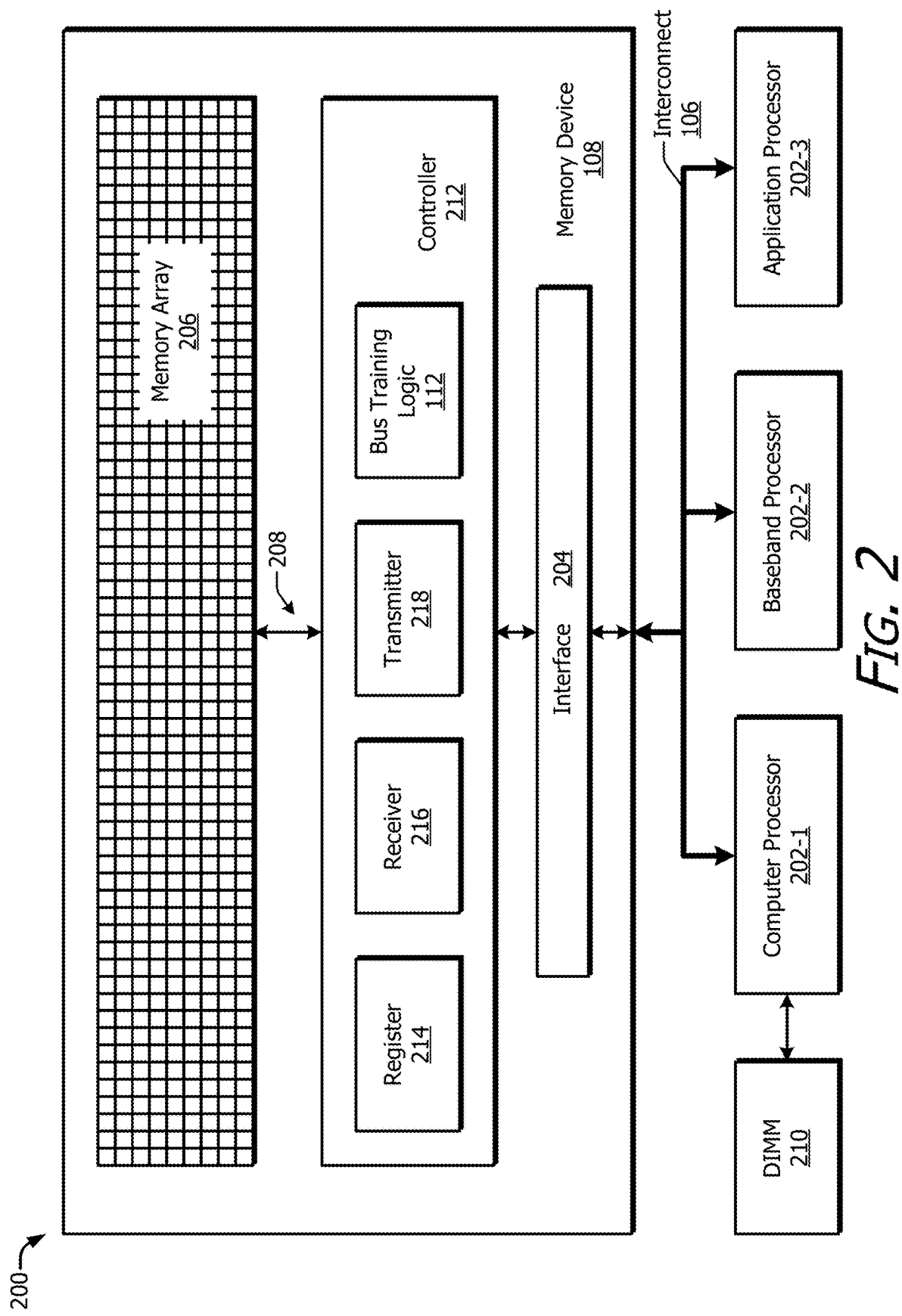
FIG. 2 illustrates example computing systems that can implement aspects of bus training with interconnected dice in conjunction with a memory device.
Figure 4:
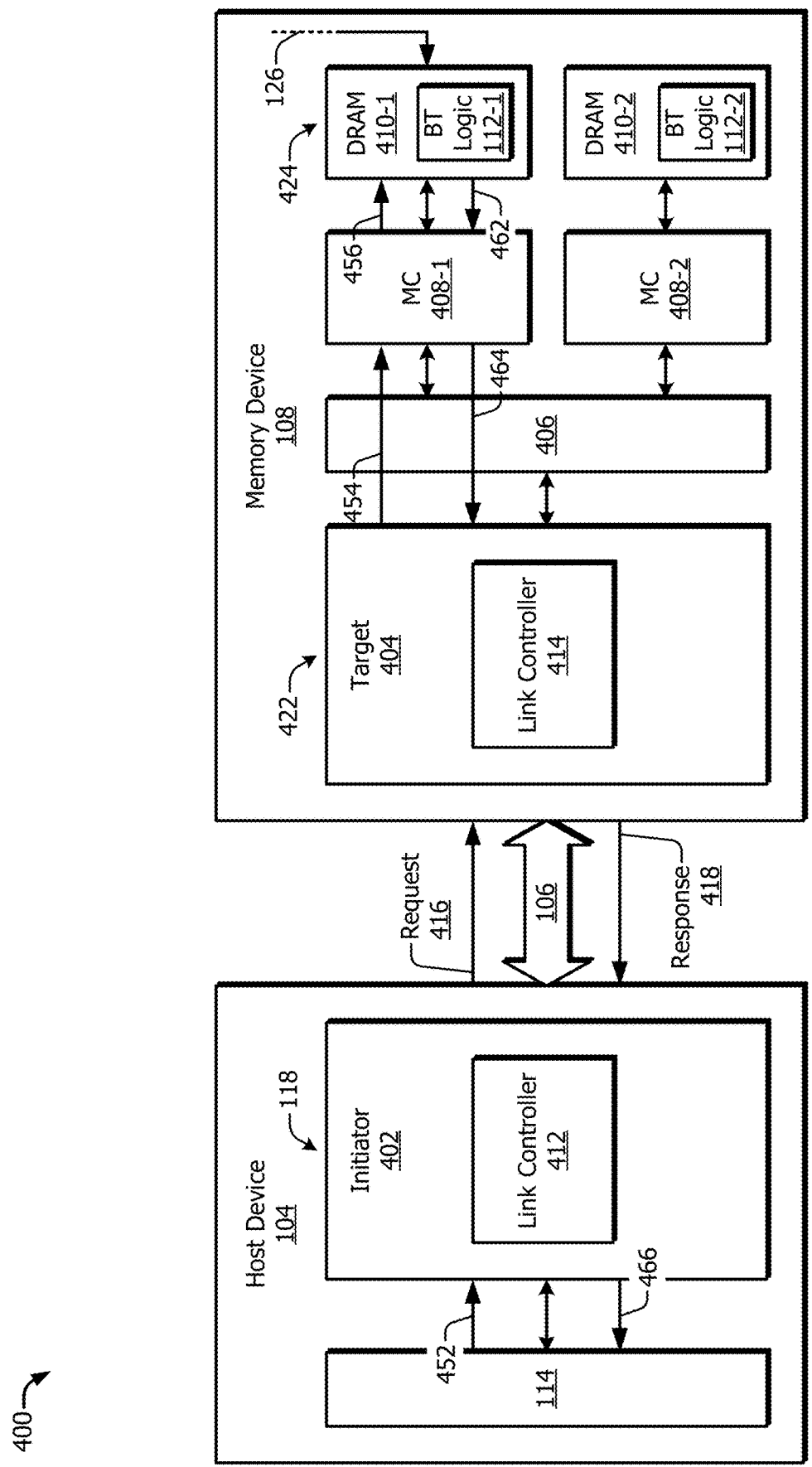
FIG. 4 illustrates examples of a system that can include a host device and a memory device coupled together via an interconnect and that can implement aspects of bus training with interconnected dice.

In some implementations, the controller 118 can be realized as a memory controller that interfaces with the interconnect 106 using an SDRAM protocol or standard, such as a DDR Version 5 standard. In other implementations, the apparatus 102 operates with one or more protocols over the interconnect 106. The apparatus 102 can operate, for example, a Compute Express Link™ (CXL) protocol across the interconnect 106. In at least some of these cases, the apparatus 102 can overlay the CXL protocol on top of a PCIe protocol for the physical layer. Thus, the controller 118 can comport with a CXL standard or a PCIe standard, including comporting with both. Similarly, a controller (e.g., as shown in FIGS. 2 and 4) at the memory device 108 can comport with a CXL standard or a PCIe standard, including with both. Examples of devices that comport with a CXL standard are described below with reference to FIG. 4. As shown with respect to FIG. 4, a CXL memory device may include a memory controller and a memory, with at least the memory including bus training logic 112 as described herein. Other circuitry, techniques, and mechanisms are also described below. Next, however, this document describes example computing architectures with one or more processors and a memory device.

FIG. 2 illustrates examples of a computing system 200 that can implement aspects of bus training with interconnected dice in conjunction with a memory device. In some implementations, the computing system 200 includes at least one memory device 108, at least one interconnect 106, and at least one processor 202. The memory device 108 can include, or be associated with, at least one memory array 206, at least one controller 212, and at least one interface 204. The at least one controller 212 can be communicatively coupled to the memory array 206 via at least one interconnect 208 (e.g., an "internal" interconnect). The memory array 206 and the controller 212 may be components that are integrated on a single semiconductor die or that are located on separate semiconductor dice (e.g., but still coupled to or disposed on a same PCB). Each of the memory array 206 or the controller 212 may also be distributed across multiple dices (or dies).

The memory device 108 can correspond, for example, to one or more of a cache memory, main memory, or storage memory of the apparatus 102 of FIG. 1. Thus, the memory array 206 can include an array of memory cells. These memory cells can include, but are not limited to, memory cells of Static Random-Access Memory (SRAM), Dynamic Random-Access Memory (DRAM), Synchronous DRAM (SDRAM), three-dimensional (3D) stacked DRAM, Double Data Rate (DDR) memory, low-power Dynamic Random-Access Memory (DRAM), Low-Power Double Data Rate (LPDDR) Synchronous Dynamic Random-Access Memory (SDRAM), phase-change memory (PCM), or flash memory.

The controller 212 can include any one or more of a number of components that can be used by the memory device 108 to perform various operations. These operations can include communicating with other devices, managing performance, modulating memory access rates, refreshing the memory array, training to use a bus, and performing memory read or write operations. For example, the controller 212 can include at least one register 214, at least one receiver 216, at least one transmitter 218, and at least one instance of bus training logic 112.

The register 214 may be implemented, for example, as one or more registers that can store information to be used by the controller 212, by another part of the memory device 108, or by a part of a host device 104, such as a controller 118 as depicted in FIG. 1. A register 214 may store, for instance, a mode value indicative of if a bus is being trained, a timing parameter that controls a latching of values from a bus, and so forth. The controller 212 may include more, fewer, different, and/or alternative components. Although depicted separately, the components of the controller 212 may be nested with respect to each other, may provide functionality or circuitry that is at least partially overlapping with another component, and so forth. In some cases, the receiver 216 or the transmitter 218, including one or more instances of both, may be incorporated as part of the interface 204.

The interface 204 can couple the controller 212 or the memory array 206 directly or indirectly to the interconnect 106. The receiver 216 can receive information via the interconnect 106, such as from a processor 202. The transmitter 218 can transmit information onto the interconnect 106. As shown in FIG. 2, the register 214, the receiver 216, the transmitter 218, and the bus training logic 112 can be part of a single component (e.g., the controller 212). In other implementations, one or more of the register 214, the receiver 216, the transmitter 218, or the bus training logic 112 may be implemented as separate components, which can be provided on a single semiconductor die or disposed across multiple semiconductor dice. These components of the controller 212 may be individually or jointly coupled to the interconnect 106 via the interface 204.

The interconnect 106 may be implemented with any one or more of a variety of interconnects that communicatively couple together various components and enable commands, addresses, messages, packets, data, and/or other information to be transferred between two or more of the various components (e.g., between the memory device 108 and any of the one or more processors 202). The information may be propagated over the interconnect 106 in a "raw" manner or using some form of encapsulation or packaging, such as with packets, frames, or flits. Although the interconnect 106 is represented with a single line or arrow in FIG. 2, the interconnect 106 may include at least one bus, at least one switching fabric, at least one crossbar, one or more wires or traces that carry voltage or current signals, at least one switch, one or more buffers, at least one lane, and so forth. Accordingly, the interconnect 106 may contain two or more of any of these, such as three buses or a bus and a switching fabric.

In some aspects, the memory device 108 may be realized as a "separate" physical component relative to the host device 104 (of FIG. 1) or any of the processors 202. Examples of physical components that may be separate include, but are not limited to, a printed circuit board (PCB), which can be rigid or flexible; a memory card; a memory stick; and a memory module, including a single in-line memory module (SIMM), a dual in-line memory module (DIMM), or a non-volatile memory express (NVMe) module. Thus, separate physical components may be located together within a same housing of an electronic device or a memory product, or such physical components may be distributed over a server rack, a data center, and so forth. Alternatively, the memory device 108 may be packaged or integrated with other physical components, including a host device 104 or a processor 202, such as by being disposed on a common PCB, combined together in a single device package, or integrated into an SoC of an apparatus.

As shown in FIG. 2, the one or more processors 202 may include a computer processor 202-1, a baseband processor 202-2, and an application processor 202-3, which are coupled to the memory device 108 through the interconnect 106. The processors 202 may each be, or may form a part of, a CPU, a GPU, an SoC, an ASIC, an FPGA, or the like. In some cases, a single "processor" can comprise multiple processing cores or resources, each dedicated to different functions, such as modem management, applications, graphics, central processing, neural network acceleration, or the like. In some implementations, the baseband processor 202-2 may include or be coupled to a modem (not shown in FIG. 2) and may be referred to as a modem processor. The modem and/or the baseband processor 202-2 may be coupled wirelessly to a network via, for example, cellular, Wi-Fi®, Bluetooth®, ultra-wideband (UWB), near field, or another technology or protocol for wireless communication.

In various implementations, the processors 202 may be connected to different memories in different manners. For example, the processors 202 may be connected directly to the memory device 108 (e.g., via the interconnect 106 as shown). Alternatively, one or more of the processors 202 may be indirectly connected to the memory device 108, such as over a network connection, through one or more other devices or components, and/or using at least one other additional interconnect. Each processor 202 may be realized similarly to the processor 114 of FIG. 1. Accordingly, a respective processor 202 can include or be associated with a respective controller, like the controller 118 depicted in FIG. 1. Alternatively, two or more processors 202 may access the memory device 108 using a shared or system controller 118. In any of such cases, the controller 118 may include bus training logic 124 (e.g., of FIG. 1).

Each processor 202 may also be separately connected to a respective memory. As shown, the computer processor 202-1 may be coupled to at least one DIMM 210 that is inserted into a DIMM slot of a motherboard. The DIMM 210 can be coupled to a memory controller (not shown), which may be part of the computer processor 202-1. The DIMM 210 may be realized with a memory device 108 and/or include any of the components shown in FIG. 2 for a memory device 108.

The apparatuses and methods that are described herein may be appropriate for memory that is designed for use with an SDRAM-compatible bus, a DDR-memory-related bus, a PCIe bus, and so forth. Thus, the described principles may be incorporated into a memory device with a PCIe interface. Further, the memory device can communicate over the interconnect 106 by overlaying a CXL protocol on the physical PCIe interface. An example of a memory standard that relates to CXL is promulgated by the Compute Express Link™ consortium and may include versions 1.0, 1.1, 2.0, and future versions. Thus, the host device 104 (e.g., of FIG. 1) or the memory device 108, including both in some cases, may comport with at least one CXL standard. Accordingly, some terminology in this document may draw from one or more of these standards or versions thereof for clarity. The described principles, however, are also applicable to memories that comport with other standards, including earlier versions or future versions of such standards, and to memories that do not adhere to a public standard. Examples of systems that may include a PCIe interface and a CXL protocol overlay are described below with reference to FIG. 4.

Figure 3:
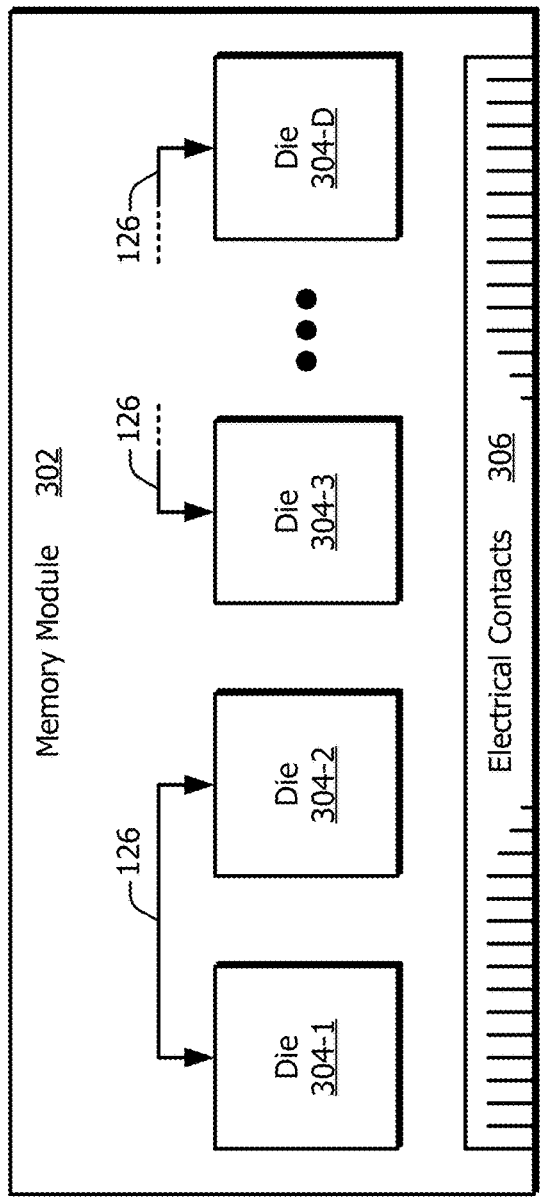
FIG. 3 illustrates examples of a memory device in which bus training with interconnected dice may be implemented.

FIG. 3 illustrates an example memory device. An example memory module 302 includes multiple dice 304. As illustrated, the memory module 302 includes a first die 304-1, a second die 304-2, a third die 304-3, and a Dth die 304-D, with "D" representing a positive integer. As a couple of examples, the memory module 302 can be a SIMM or a DIMM. As another example, the memory module 302 can interface with other components via a bus interconnect (e.g., a Peripheral Component Interconnect Express (PCIe®) bus). The memory device 108 illustrated in FIGS. 1 and 2 can correspond, for example, to a single die 304, multiple dice (or dies) 304-1 through 304-D, or a memory module 302 having one or more dice 304. As shown, the memory module 302 can include one or more electrical contacts 306 (e.g., pins) to electrically interface the memory module 302 to other components.

The memory module 302 can be implemented in various manners. For example, the memory module 302 may include a PCB, and the multiple dice 304-1 through 304-D may be mounted or otherwise attached to the PCB. The dice 304 (e.g., memory dice) may be arranged in a line or along two or more dimensions (e.g., forming a grid or array of dice). The dice 304 may have a similar size to each other or may have different sizes. Generally, each die 304 may be similar to another die 304 or different in terms of size, shape, data capacity, or control circuitries. The dice 304 may also be positioned on a single side or on multiple sides of the memory module 302. In some cases, the memory module 302 may be part of a CXL memory system or module.

In some implementations, two or more dice of the multiple dice 304-1 to 304-D may be interconnected as stacked or linked dice. As shown, the first die 304-1 and the second die 304-2 are coupled together via a bus 126, such as an "internal" data bus 126 that is not exposed to the electrical contacts 306 without an intervening die 304. Although not so depicted in FIG. 3, two or more of the dice, including at least two interconnected dice, may be packaged together (e.g., encapsulated together in plastic).

FIG. 4 illustrates examples of a system 400 that can include a host device 104 and a memory device 108 that are coupled together via an interconnect 106. The system 400 can implement aspects of bus training with interconnected dice and may form at least part of an apparatus 102 as shown in FIG. 1. As illustrated in FIG. 4, the host device 104 includes a processor 114 and a controller 118, which can be realized with at least one initiator 402. Thus, the initiator 402 can be coupled to the processor 114 or to the interconnect 106 (including to both), and the initiator 402 can be coupled between the processor 114 and the interconnect 106. Examples of initiators 402 may include a leader, a primary, a master, a requester or requesting component, a main component, and so forth.

In the illustrated example system 400, the memory device 108 includes a controller 422, which can be realized with at least one target 404. The target 404 can be coupled to the interconnect 106. Thus, the target 404 and the initiator 402 can be coupled to each other via the interconnect 106. Examples of targets 404 may include a follower, a secondary, a slave, a subordinate, a responder or responding component, a subsidiary component, and so forth. The memory device 108 also includes a memory 424. The memory 424 can be realized with at least one memory module, chip, or die having at least one memory array 206 (of FIG. 2) or another component, such as a DRAM 410 as is described below.

In example implementations, the initiator 402 includes at least one link controller 412, and the target 404 includes at least one link controller 414. The link controller 412 or the link controller 414 can instigate, coordinate, cause, or otherwise participate in or control signaling across a physical or logical link realized by the interconnect 106 in accordance with one or more protocols. The link controller 412 may be coupled to the interconnect 106. The link controller 414 may also be coupled to the interconnect 106. Thus, the link controller 412 can be coupled to the link controller 414 via the interconnect 106. Each link controller 412 or 414 may, for instance, control communications over the interconnect 106 at a link layer or at one or more other layers of a given protocol. Communication signaling may include, for example, a request 416, a response 418, and so forth.

The memory device 108 may further include at least one interconnect 406 and at least one memory controller 408 (MC 408). Within the memory device 108, and relative to the target 404, the interconnect 406, the memory controller 408, and/or the DRAM 410 (or other component of the memory 424) may be referred to as a "backend" or "downstream" component or memory component of the memory device 108. In some cases, the interconnect 406 is internal to the memory device 108 and may operate the same as or differently from the interconnect 106 or operate like the interconnect 208.

Thus, the memory device 108 can include at least one memory component. As shown, the memory device 108 may include multiple memory controllers 408-1 and 408-2 and/or multiple DRAMs 410-1 and 410-2. Although two of each are shown, the memory device 108 may include one or more than two memory controllers and/or one or more than two DRAMs. For example, a memory device 108 may include four memory controllers and 16 DRAMs, such as four DRAMs per memory controller. The memory 424 or memory components of the memory device 108 are depicted as DRAM 410 as an example only, for one or more of the memory components may be implemented as another type of memory. For instance, the memory components may include nonvolatile memory like flash or PCM. Alternatively, the memory components may include other types of volatile memory like SRAM. Thus, the memory device 108 may include a dynamic random-access memory (DRAM) array, a static random-access memory (SRAM) array, or a nonvolatile memory array. A memory device 108 may also include any combination of memory types.

In some cases, the memory device 108 may include the target 404, the interconnect 406, the at least one memory controller 408, and the at least one DRAM 410 within a single housing or other enclosure. The enclosure, however, may be omitted or may be merged with one for the host device 104, the system 400, or an apparatus 102 (of FIG. 1). In some cases, each of these components can be realized with a separate IC. In some of such cases, the interconnect 406 can be disposed on a PCB. Each of the target 404, the memory controller 408, and the DRAM 410 may be fabricated on at least one IC and packaged together or separately. The packaged IC(s) may be secured to or otherwise supported by the PCB (or PCB assembly) and may be directly or indirectly coupled to the interconnect 406. In other cases, the target 404 of the controller 422, the interconnect 406, and/or the one or more memory controllers 408 may be integrated together into one IC. In some of such cases, this IC may be coupled to a PCB, and one or more modules for the components of the memory 424 may also be coupled to the same PCB, which can form a CXL memory device 108. This memory device 108 may be enclosed within a housing or may include such a housing. The components of the memory device 108 may, however, be fabricated, packaged, combined, and/or housed in other manners.

As illustrated in FIG. 4, the target 404, including the link controller 414 thereof, can be coupled to the interconnect 406. Each memory controller 408 of the multiple memory controllers 408-1 and 408-2 can also be coupled to the interconnect 406. Accordingly, the target 404 and each memory controller 408 of the multiple memory controllers 408-1 and 408-2 can communicate with each other via the interconnect 406. Each memory controller 408 is coupled to at least one DRAM 410. As shown, each respective memory controller 408 of the multiple memory controllers 408-1 and 408-2 is coupled to at least one respective DRAM 410 of the multiple DRAMs 410-1 and 410-2. Each memory controller 408 of the multiple memory controllers 408-1 and 408-2 may, however, be coupled to a respective set of multiple DRAMs or other memory components.

Each memory controller 408 can access at least one DRAM 410 by implementing one or more memory access protocols to facilitate reading or writing data based on at least one memory address. The memory controller 408 can increase bandwidth or reduce latency for the memory accessing based on a type of the memory or an organization of the memory components, such as the multiple DRAMs. The multiple memory controllers 408-1 and 408-2 and the multiple DRAMs 410-1 and 410-2 can be organized in many different manners. For example, each memory controller 408 can realize one or more memory channels for accessing the DRAMs. Further, the DRAMs can be manufactured to include one or more ranks, such as a single-rank or a dual-rank memory module. Each DRAM 410 (e.g., at least one DRAM IC chip) may also include multiple banks, such as 8 or 16 banks.

A forward path of the memory device 108 may include one or more memory request queues (not shown). A return path of the memory device 108 may include one or more memory response queues (not shown). These queues may be present in, for example, the controller 422, a memory controller 408, a memory array, such as the DRAM 410, and so forth. Examples of a forward path and a return path are described next as part of an accessing operation for the memory device 108.

This document now describes examples of the host device 104 accessing the memory device 108. The examples are described in terms of a general memory access (e.g., a memory request) which may include a memory read access (e.g., a memory read request for a data retrieval operation) or a memory write access (e.g., a memory write request for a data storage operation). The processor 114 can provide a memory access request 452 to the initiator 402. The memory access request 452 may be propagated over a bus or other interconnect that is internal to the host device 104. This memory access request 452 may be or may include a read request or a write request. The initiator 402, such as the link controller 412 thereof, can reformulate the memory access request 452 into a format that is suitable for the interconnect 106. This reformulation may be performed based on a physical protocol or a logical protocol (including both) applicable to the interconnect 106. Examples of such protocols are described below.

The initiator 402 can thus prepare a request 416 and transmit the request 416 over the interconnect 106 to the target 404. The target 404 receives the request 416 from the initiator 402 via the interconnect 106. The target 404, including the link controller 414 thereof, can process the request 416 to determine (e.g., extract, decode, or interpret) the memory access request. Based on the determined memory access request, and as part of the forward path of the memory device 108, the target 404 can forward a memory request 454 over the interconnect 406 to a memory controller 408, which is the first memory controller 408-1 in this example. For other memory accesses, the targeted data may be accessed with the second DRAM 410-2 through the second memory controller 408-2. Thus, the first memory controller 408-1 receives the memory request 454 via the internal interconnect 406.

The first memory controller 408-1 can prepare a memory command 456 based on the memory request 454. The first memory controller 408-1 can provide the memory command 456 to the first DRAM 410-1 over an interface or interconnect appropriate for the type of DRAM or other memory component. An applicable memory standard includes, by way of example only, LPDDR5 for SDRAM. The first DRAM 410-1 receives the memory command 456 from the first memory controller 408-1 and can perform the corresponding memory operation. Based on the results of the memory operation, the first DRAM 410-1 can generate a memory response 462. If the memory request 416 is for a read operation, the memory response 462 can include the requested data. If the memory request 416 is for a write operation, the memory response 462 can include an acknowledgement that the write operation was performed successfully. As part of the return path of the memory device 108, the first DRAM 410-1 can provide the memory response 462 to the first memory controller 408-1.

Continuing the return path of the memory device 108, the first memory controller 408-1 receives the memory response 462 from the first DRAM 410-1. Based on the memory response 462, the first memory controller 408-1 can prepare a memory response 464 and transmit the memory response 464 to the target 404 via the interconnect 406. The target 404 receives the memory response 464 from the first memory controller 408-1 via the interconnect 406. Based on this memory response 464, and responsive to the corresponding memory request 416, the target 404 can formulate a response 418 for the requested memory operation. The memory response 418 can include read data or a write acknowledgement and be formulated in accordance with one or more protocols of the interconnect 106.

To respond to the memory request 416 from the host device 104, the target 404 of the memory device 108 can transmit the memory response 418 to the initiator 402 over the interconnect 106. Thus, the initiator 402 receives the response 418 from the target 404 via the interconnect 106. The initiator 402 can therefore respond to the "originating" memory access request 452, which is from the processor 114 in this example. To do so, the initiator 402 prepares a memory access response 466 using the information from the response 418 and provides the memory access response 466 to the processor 114. In these manners, the host device 104 can obtain memory access services from the memory device 108 using the interconnect 106. Example aspects of an interconnect 106 are described next.

The interconnect 106 can be implemented in a myriad of manners to enable memory-related communications to be exchanged between the initiator 402 and the target 404. Generally, the interconnect 106 can carry memory-related information, such as data or a memory address, between the initiator 402 and the target 404. In some cases, the initiator 402 or the target 404 (including both) can prepare memory-related information for communication across the interconnect 106 by encapsulating such information. The memory-related information can be encapsulated or incorporated into, for example, at least one packet (e.g., at least one flit). One or more packets may include at least one header with information indicating or describing the content of each packet.

In example implementations, the interconnect 106 can support, enforce, or enable memory coherency for a shared memory system, for a cache memory, for combinations thereof, and so forth. Thus, the memory device 108 can operate in a cache coherent memory domain in some cases. Additionally or alternatively, the interconnect 106 can be operated based on a credit allocation system. Thus, the initiator 402 and the target 404 can communicate using, for example, a credit-based flow control mechanism. Possession of a credit can enable an entity, such as the initiator 402, to transmit another memory request 416 to the target 404. The target 404 may return credits to "refill" a credit balance at the initiator 402. Credit logic of the target 404 or credit logic of the initiator 402 (including both instances of credit logic working together in tandem) can implement a credit-based communication scheme across the interconnect 106.

The system 400, the initiator 402 of the host device 104, or the target 404 of the memory device 108 may operate or interface with the interconnect 106 in accordance with one or more physical or logical protocols. For example, the interconnect 106 may be built in accordance with a Peripheral Component Interconnect Express® (PCIe or PCI-E) standard. Applicable versions of the PCIe standard may include 1.x, 2.x, 3.x, 4.0, 5.0, 6.0, and future or alternative versions of the standard.

In some cases, at least one other standard is layered over the physical-oriented PCIe standard. For example, the initiator 402 or the target 404 can communicate over the interconnect 106 in accordance with a Compute Express Link™ (CXL) standard. Applicable versions of the CXL standard may include 1.x, 2.0, and future or alternative versions of the standard. Thus, the initiator 402 and/or the target 404 may operate so as to comport with a PCIe standard or PCIe protocol and/or a CXL standard or CXL protocol. A device or component may comprise or operate in accordance with a CXL Type 1, Type 2, or Type 3 device. A CXL standard may operate based on credits, such as request credits, response credits, and data credits.

In some implementations, bus training with interconnected dice can be employed in a CXL or analogous environment. For example, one or more components of DRAM 410, such as at least one chip or die thereof, can include an instance of bus training logic 112. As shown, the first DRAM 410-1 includes the first BT logic 112-1, and the second DRAM 410-2 includes the second BT logic 112-2. A data bus 126 that can couple together two or more dice in an interconnected manner within a memory package is also shown. A memory controller 408 may include an instance of bus training logic 124 (e.g., as shown in FIG. 1) to interact with the bus training logic 112. The relevant bus can be coupled between the memory controller 408 and the associated DRAM 410. Example aspects of bus training between a memory controller and multiple dice are described next, starting with FIGS. 5, 6-1, and 6-2.

Example Techniques and Hardware

Figure 5:
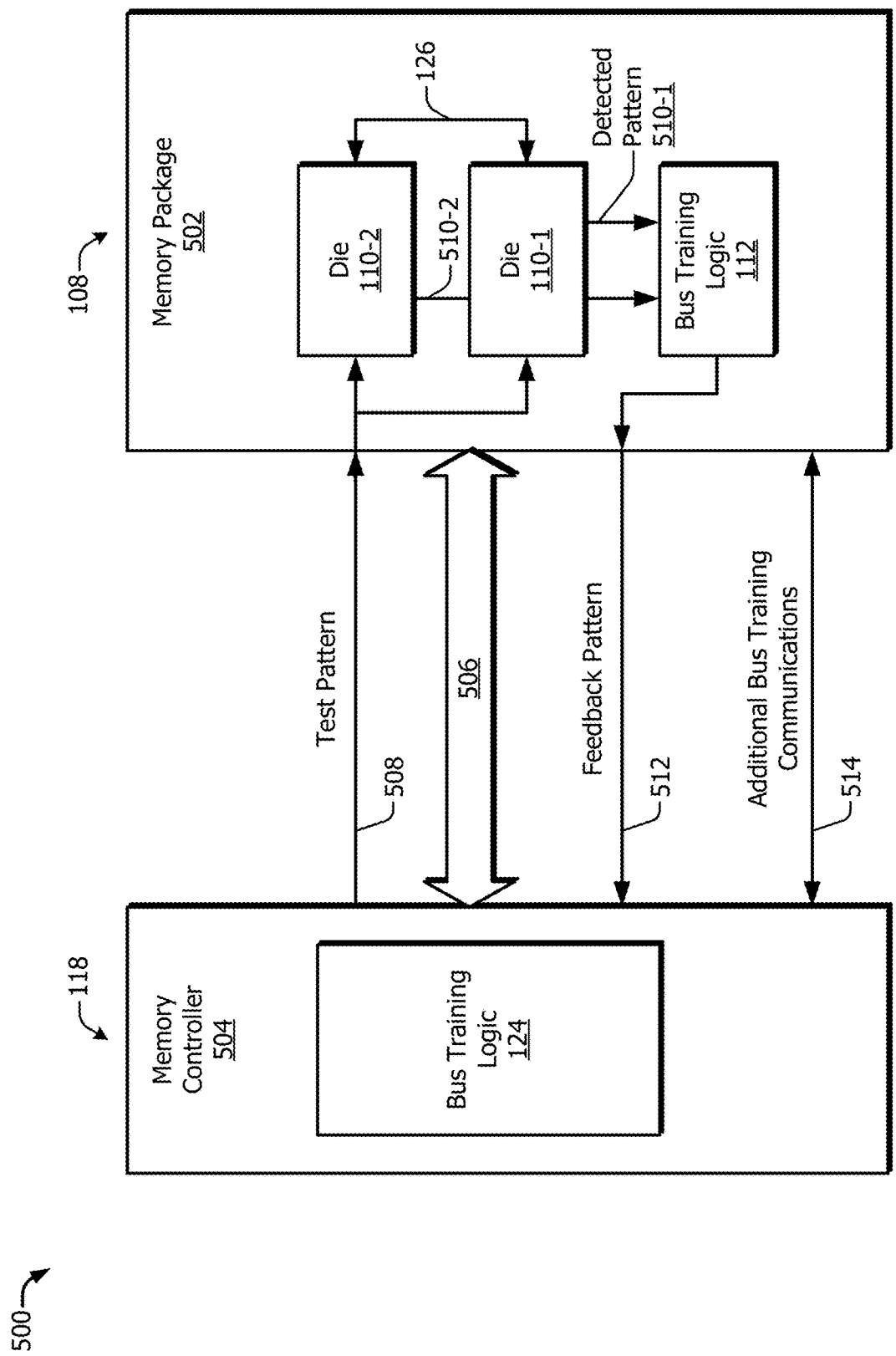
FIG. 5 illustrates example schemes for bus training with interconnected dice, which schemes can involve a memory controller and a memory package that houses multiple memory dice.

FIG. 5 illustrates example schemes 500 for bus training with interconnected dice, which schemes 500 can include a memory controller 504 and a memory package 502 that at least partially encases multiple memory dice 110-1 and 110-2. The memory controller 504 is an example of a controller 118 (e.g., of FIG. 1), and the memory package 502 is an example of a memory device 108. As shown, the memory package 502 is coupled to the memory controller 504 via an interconnect 506. The interconnect 506 is an example of an interconnect 106 (e.g., of FIGS. 1, 2, and 4). The memory controller 504 includes bus training logic 124. The memory package 502 includes bus training logic 112 and at least two dice: a first die 110-1 and a second die 110-2. The first and second dice 110-1 and 110-2 are coupled together via a bus 126, such as a data bus 126. The bus training logic 112 can be part of one of the dice, part of each of the dice, separate from all the dice, distributed across two or more of the dice, part of one die but separate from other dice, or some combination thereof.

In example implementations, the interconnect 506 includes at least one bus, such as a first bus and a second bus (not shown in FIG. 5). To perform a bus training procedure for the first bus, the bus training logic 124 of the memory controller 504 transmits a test pattern 508 over the first bus of the interconnect 506. The first die 110-1 receives the test pattern 508 via the first bus, and the second die 110-2 also receives the test pattern 508 via the first bus. In such cases, the first and second dice 110-1 and 110-2 may share the first bus. Depending on the timing of a detection of the test pattern 508, each die 110 may latch or otherwise detect a different detection pattern 510 based on receiving a same test pattern 508 from the bus training logic 124 of the memory controller 504.

The first die 110-1 transmits a first detected pattern 510-1 to the bus training logic 112. The second die 110-2 transmits a second detected pattern 510-2 to the bus training logic 112. In a connected die architecture, the second die 110-2 may use the data bus 126 and the first die 110-1 to transmit the second detected pattern 510-2 to the bus training logic 112. The bus training logic 112 produces a feedback pattern 512 based on the first and second detected patterns 510-1 and 510-2. For example, the bus training logic 112 can select one or more bits from the first detected pattern 510-1 and one or more bits from the second detected pattern 510-2. The bus training logic 112 then combines the selected bits from the two detected patterns 510-1 and 510-2 to produce the feedback pattern 512.

The bus training logic 112 transmits the feedback pattern 512 to the bus training logic 124 of the memory controller 504 over the interconnect 506. In some cases, the bus training logic 112 transmits the feedback pattern 512 to the memory controller 504 over the second bus of the interconnect 506. The memory controller 504 can receive the feedback pattern 512 via the second bus. The bus training logic 124 may continue the bus training based on the feedback pattern 512. Thus, the bus training logic 112 of the memory package 502 and the bus training logic 124 of the memory controller 504 may exchange additional bus training communications 514.

These additional bus training communications 514 may pertain to the bus training logic 124 transmitting a different test pattern 508 and the bus training logic 112 returning a different feedback pattern 512 based on the different test pattern 508. These additional bus training communications 514 may include the bus training logic 124 of the memory controller 504 sending commands to the memory package 502 to change a timing of the detection of a received test pattern 508. The detection timing may be changed, for instance, by adjusting an amount by which a clock signal is delayed before the clock signal triggers a latching of the received test pattern 508.

Figures 1, 6:
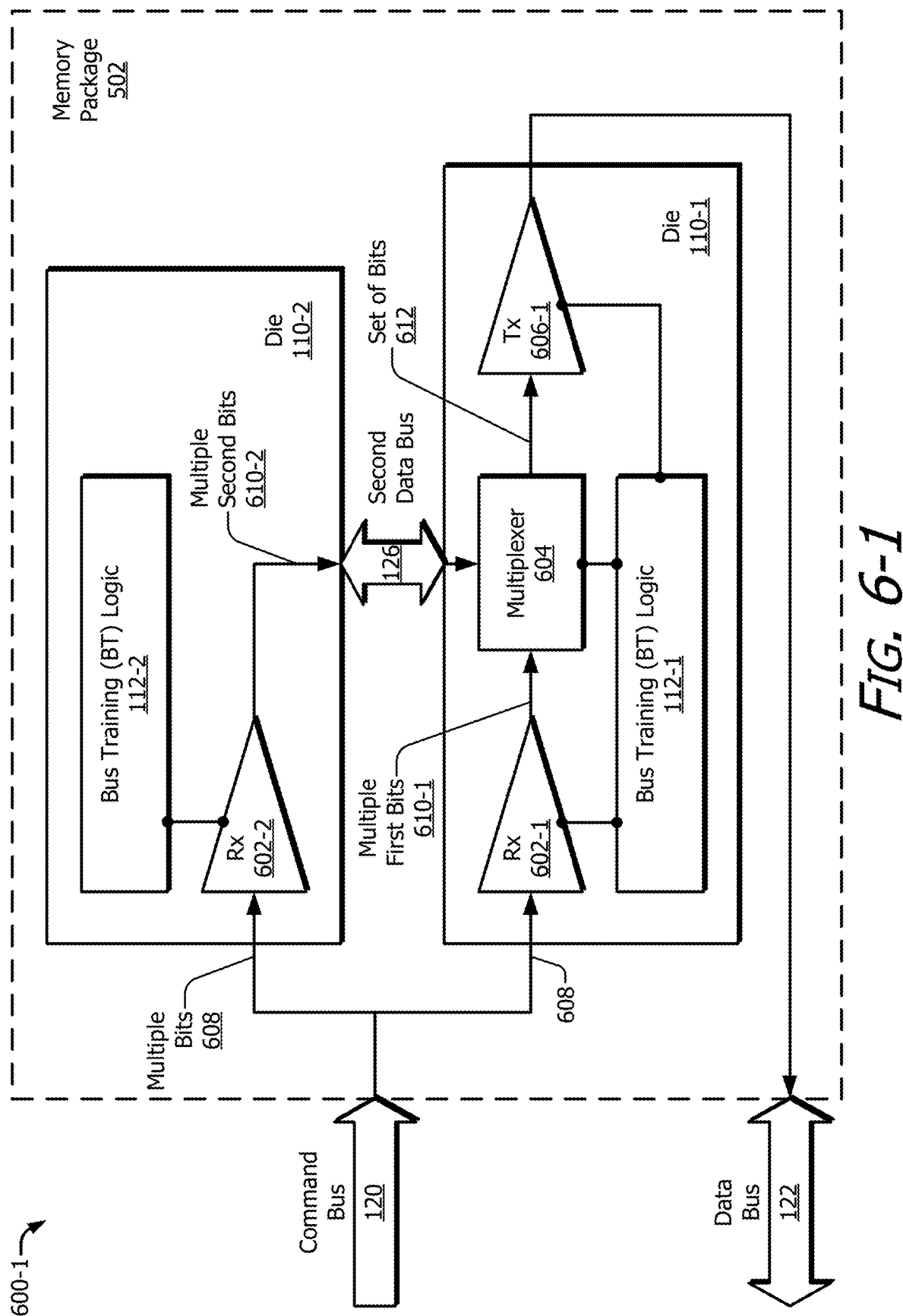
Figures 2, 6:
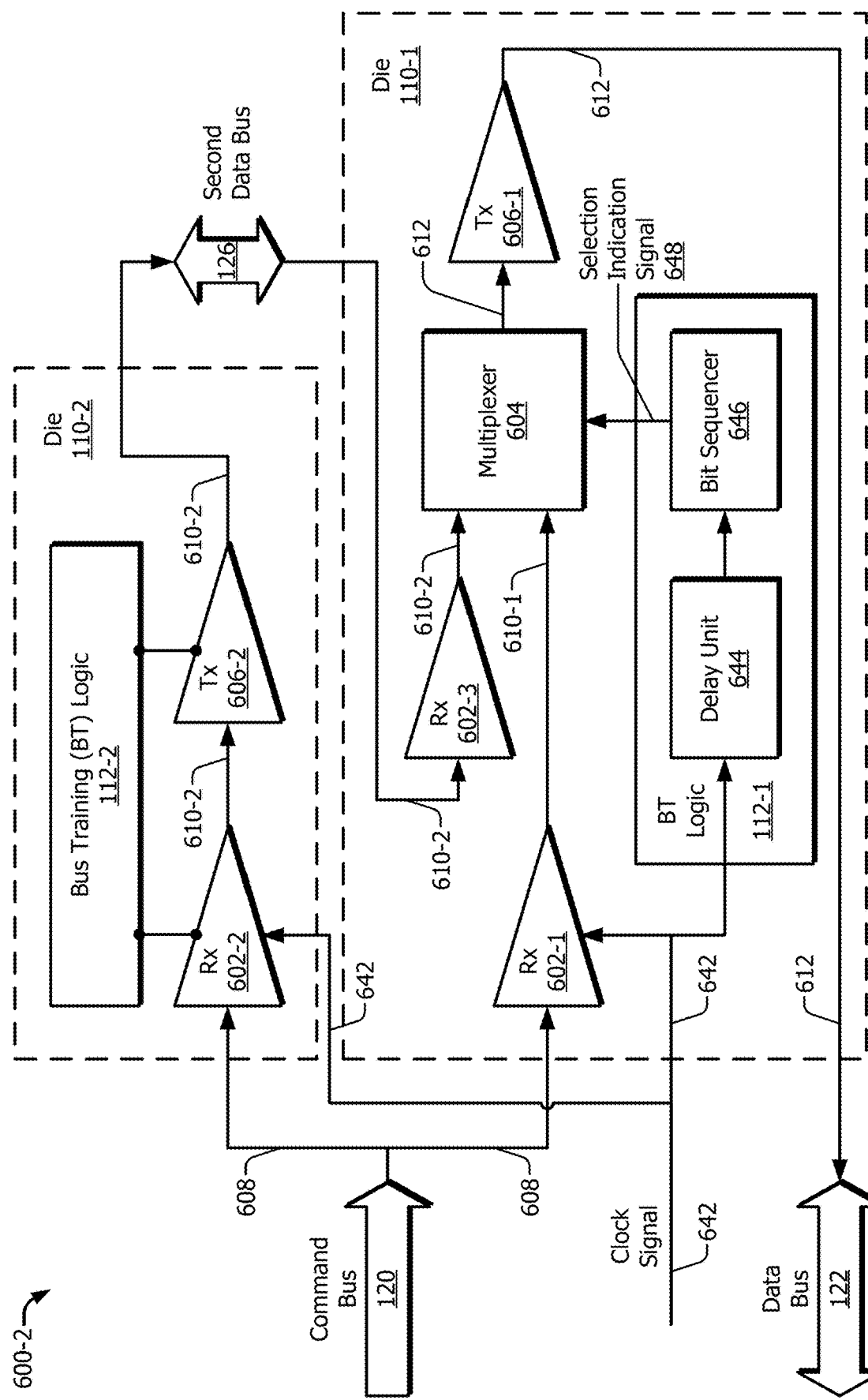

FIGS. 6-1 and 6-2 illustrate example architectures 600-1 and 600-2, respectively, for bus training with interconnected dice. The architectures 600-1 and 600-2 can include at least two dice 110-1 and 110-2 that share a bus 120 and that are coupled together by another bus 126. As depicted explicitly in FIG. 6-1, the architectures 600-1 and 600-2 can include a memory package 502 that includes at least a first die 110-1 and a second die 110-2. In example implementations, the memory package 502 is coupled to two "external" buses: a command bus 120 and a data bus 122. The command bus 120 is directly coupled to the first die 110-1 and the second die 110-2. The data bus 122, on the other hand, is directly coupled to the first die 110-1 but indirectly coupled to the second die 110-2. In some cases, this indirect coupling between the second die 110-2 and the data bus 122 includes the first die 110-1 and a second data bus 126.

In certain aspects, the first die 110-1 includes a first receiver 602-1, a multiplexer 604, a first transmitter 606-1, and first bus training logic 112-1. The second die 110-2 includes a second receiver 602-2 and second bus training logic 112-2. The first die 110-1 and the second die 110-2 are coupled together via a second bus: the second data bus 126. The second data bus 126 enables the two dice to communicate data therebetween to support operations, such as a memory read operation or a memory write operation. In some cases, the first die 110-1 can comprise or function as an interface die with respect to one or more other dice, such as the second die 110-2. In such cases, the second die 110-2 may comprise or function as a linked die with respect to the first die 110-1.

As illustrated for certain examples, the second receiver 602-2 is coupled between the command bus 120 and the second data bus 126. The second data bus 126 is coupled between the second receiver 602-2 and the multiplexer 604. The first receiver 602-1, the multiplexer 604, and the first transmitter 606-1 are coupled together in series between the command bus 120 and the data bus 122. The multiplexer 604 is coupled between the first receiver 602-1 and the transmitter 606-1. The second bus training logic 112-2 is coupled to the second receiver 602-2 and can control, at least partially, operations of the second receiver 602-2. The first bus training logic 112-1 is coupled to the first receiver 602-1, the multiplexer 604, and the first transmitter 606-1. Thus, the first bus training logic 112-1 can control, at least partially, operations of the first receiver 602-1, the multiplexer 604, or the first transmitter 606-1. In alternative implementations, an instance of the bus training logic 112 may include one or more other components, such as one that is depicted or another component. For example, the first bus training logic 112-1 may include the multiplexer 604.

In example operations, the first bus training logic 112-1 controls the functioning of the first die 110-1 relative to bus training. Similarly, the second bus training logic 112-2 controls the functioning of the second die 110-2 relative to bus training. To train for using the command bus 120, the bus training logic 124 of the memory controller 504 (e.g., of FIG. 5) transmits multiple bits 608 over the command bus 120. The second receiver 602-2 receives the multiple bits 608 via the command bus 120 and detects the multiple bits 608 as multiple second bits 610-2.

The multiple second bits 610-2 may differ from the multiple bits 608 because, for instance, a timing of the latching of the multiple bits 608 may deviate from a suitable timing for the second receiver 602-2. In other words, the second receiver 602-2 may latch the multiple bits 608 "slightly" too late or "slightly" too early to correctly detect them. The first receiver 602-1 receives the multiple bits 608 via the command bus 120 and detects the multiple bits 608 as multiple first bits 610-1 as part of a receiving operation. Similarly, the multiple first bits 610-1 may differ from the multiple bits 608 because, for instance, a timing of the latching of the multiple bits 608 may deviate from a suitable timing for the first receiver 602-1.

Responsive to bit detection, the second bus training logic 112-2 causes the multiple second bits 610-2 to be forwarded over the second data bus 126 to the multiplexer 604. The first receiver 602-1 forwards the multiple first bits 610-1 to the multiplexer 604. The first bus training logic 112-1 can control operation of the multiplexer 604 to produce a set of bits 612. The first bus training logic 112-1 can combine the multiple first bits 610-1 and the multiple second bits 610-2 to produce the set of bits 612. For example, the first bus training logic 112-1 can combine the multiple first bits 610-1 and the multiple second bits 610-2 using at least the multiplexer 604 to produce the set of bits 612.

The first bus training logic 112-1 controls the multiplexer 604 to select at least a portion of the bits from the multiple first bits 610-1 and at least a portion of the bits from the multiple second bits 610-2. The selected portions are included in the set of bits 612. Thus, the set of bits 612 can include a combination (e.g., a mixture) of the bits as detected by the second receiver 602-2 of the second die 110-2 and the bits as detected by the first receiver 602-1 of the first die 110-1. Examples of the process to produce the set of bits 612 are described further below, including with reference to FIG. 7. The multiplexer 604 provides the set of bits 612 to the transmitter 606-1 (e.g., the first transmitter 606-1).

Under the control of the first bus training logic 112-1, the first transmitter 606-1 transmits the set of bits 612 over the data bus 122. Thus, the bus training logic 124 of the memory controller 504 (of FIG. 5) can receive the set of bits 612 via the data bus 122. In these manners, the bus training logic 112 can provide feedback on a test pattern to the bus training logic 124 of the memory controller 504 with the feedback indicative of how multiple dice are jointly detecting the test pattern on the bus being trained. This enables the bus training logic 124 to operate as if one die is being trained for bus communications without masking other dice, even with multiple dice being trained substantially simultaneously. To continue the bus training procedure, the bus training logic 124 of the memory controller 504 analyzes the set of bits 612 to determine what additional communications or actions for bus training are to be performed next. Examples of this are described below with reference to FIG. 8.

With reference to FIG. 6-2, additional example aspects are depicted in the architectures 600-2 as compared to the architectures 600-1 of FIG. 6-1. As shown, the second die 110-2 includes a second transmitter 606-2, and the first die 110-1 includes a third receiver 602-3. The second data bus 126 is coupled between an output of the second transmitter 606-2 and an input of the third receiver 602-3. Further, the first bus training logic 112-1 includes a delay unit 644 and a bit sequencer 646. A clock signal 642 is also shown coupled to the delay unit 644, the first receiver 602-1, and the second receiver 602-2.

The first and second receivers 602-1 and 602-2 detect (e.g., latch or secure a voltage or current level of) the multiple bits 608 responsive to the clock signal 642. The clock signal 642 can have an associated timing parameter that establishes a delay of at least one edge (e.g., a rising edge or a falling edge) of the clock signal 642. The delay may be instituted using, for instance, a variable quantity of delay units (not shown with respect to the clock signal 642). Thus, the first and second receivers 602-1 and 602-2 can detect the multiple bits 608 received from the command bus 120 based on at least one edge of the clock signal 642 that occurs at least partially based on the timing parameter. The command bus 120 may have any bit-width, such 1, 2, 7, 16, and so forth. Accordingly, the multiple bits 608 may have any such quantity of bits.

To communicate the multiple second bits 610-2 between the second die 110-2 and the first die 110-1, the second transmitter 606-2 accepts the multiple second bits 610-2 from the second receiver 602-2. At least partially under the control of the second bus training logic 112-2, the second transmitter 606-2 of the second die 110-2 transmits the multiple second bits 610-2 over the second data bus 126 to the third receiver 602-3 of the first die 110-1. The third receiver 602-3 receives the multiple second bits 610-2 and forwards them to the multiplexer 604.

In example implementations, the multiplexer 604 can include at least two inputs (e.g., a first input and a second input), an output, and a control input. The multiplexer 604 receives the multiple first bits 610-1 at the first input and the multiple second bits 610-2 at the second input. The multiplexer 604 produces the set of bits 612 for the feedback pattern 512 (e.g., of FIG. 5) based on the multiple first bits 610-1 and the multiple second bits 610-2 and responsive to a selection indication signal 648. The first bus training logic 112-1 can generate the selection indication signal 648 as described below. The multiplexer 604 provides the set of bits 612 to the first transmitter 606-1 for transmission on the data bus 122.

The first bus training logic 112-1 includes at least one delay unit 644 and the bit sequencer 646. The delay unit 644 delays the clock signal 642 to enable one or more receivers (e.g., the first and second receivers 602-1 and 602-2) or other circuitry to process the multiple bits 608. For instance, the delay unit 644 can delay the clock signal 642 by a time period sufficient to enable the multiplexer 604 to be receiving the multiple first bits 610-1 and the multiple second bits 610-2 while a selection indication signal 648 for the corresponding multiple bits 608 is valid at the control input of the multiplexer 604.

The bit sequencer 646 can operate responsive to the clock signal 642, including a delayed version of the clock signal 642. The bit sequencer 646 generates the selection indication signal 648. The selection indication signal 648 indicates to the multiplexer 604 which one or more bits of the multiple first bits 610-1 and which one or more bits of the multiple second bits 610-2 are to be selected for inclusion in the set of bits 612. In some cases, the bit sequencer 646 generates at least one value as the selection indication signal 648 using a pseudo-random number mechanism. Example operations of the bit sequencer 646 are described next with reference to FIG. 7.

Figure 7:
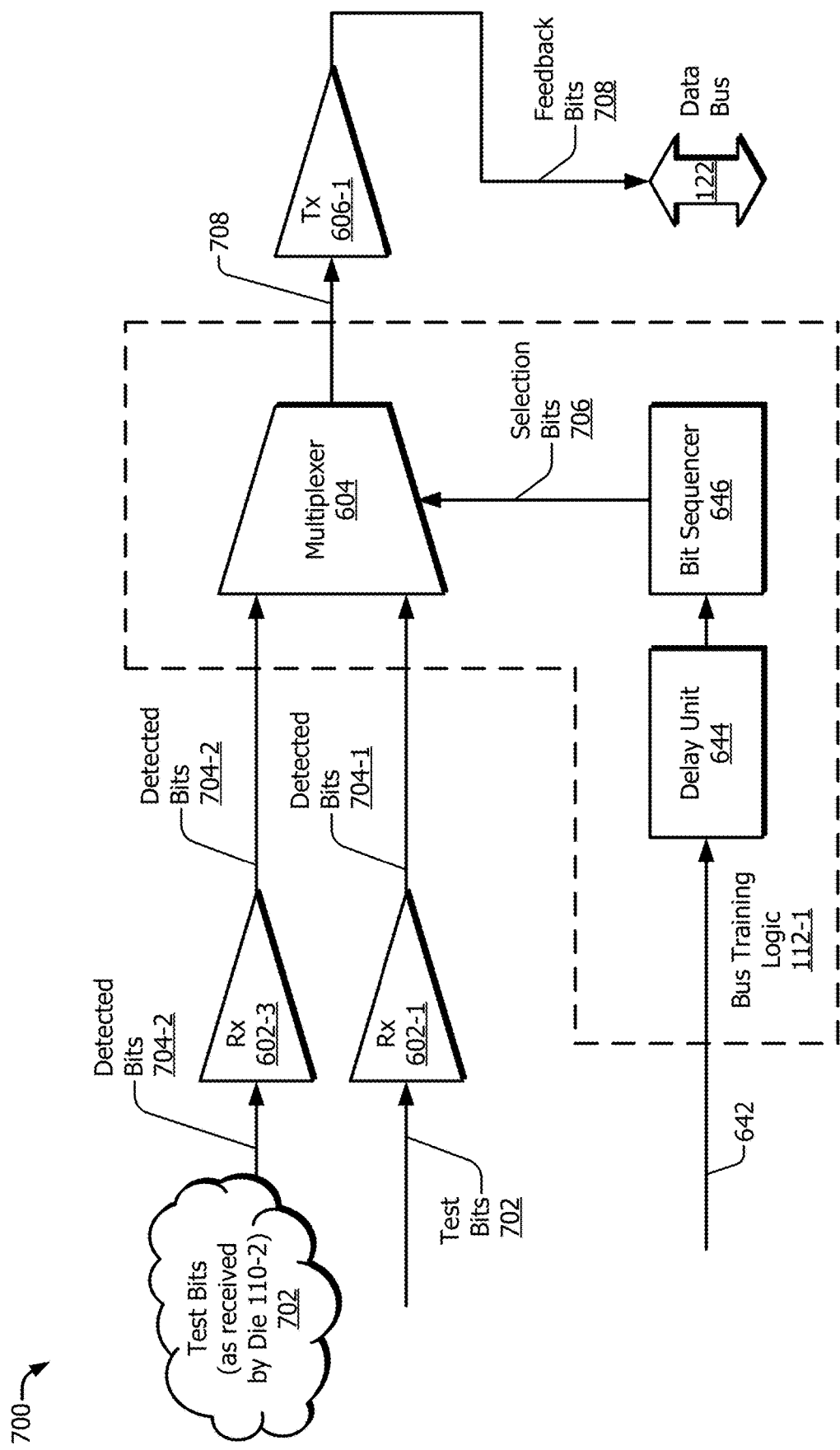
FIG. 7 illustrates examples of bit-combination logic that combines bits of a test pattern as detected by multiple dice and that produces a combined feedback pattern.

FIG. 7 illustrates, generally at 700, examples of bit combination logic that combines bits of a test pattern as detected by multiple dice and that produces a combined feedback pattern. The components shown in FIG. 7 can be part of the first die 110-1 of FIGS. 6-1 and 6-2. In example operations, the first die 110-1 and the second die 110-2 each receives test bits 702 from the bus training logic 124 (e.g., of a memory controller 504) via the command bus 120 (e.g., of FIGS. 6-1 and 6-2). As is described above with reference to FIGS. 6-1 and 6-2, the second die 110-2 uses the second receiver 602-2 to detect the received test bits 702 as second detected bits 704-2. The second die 110-2 uses the second transmitter 606-2 to transmit the second detected bits 704-2 to the third receiver 602-3 at the first die 110-1, as is depicted in FIG. 7.

The third receiver 602-3 forwards the second detected bits 704-2 to a second input of the multiplexer 604. The first receiver 602-1 of the first die 110-1 detects the received test bits 702 at an input thereof as first detected bits 704-1. The first receiver 602-1 forwards from an output thereof the first detected bits 704-1 to a first input of the multiplexer 604. The multiplexer 604 therefore accepts or receives the first detected bits 704-1 and the second detected bits 704-2 at two inputs thereof. If there are two or more linked dice, or if more than two dice are interconnected as described herein, the multiplexer 604 may have more than two inputs.

In example implementations, the multiplexer 604 selects at least one bit (e.g., a first set of bits) from the first detected bits 704-1 and at least one bit (e.g., a second set of bits) from the second detected bits 704-2 based on one or more selection bits 706 from the bit sequencer 646. In some cases, the bit sequencer 646 operates to exclude at least one bit of the multiple first detected bits 704-1 to produce a first set of bits that become part of the feedback bits 708 and/or to exclude at least one bit of the multiple second detected bits 704-2 to produce a second set of bits that become part of the feedback bits 708. The multiplexer 604 provides the selected bits as feedback bits 708. The first transmitter 606-1 then transmits the feedback bits 708 over the data bus 122 as part of a bus training procedure. The bit sequencer 646 can operate as a pseudo-random bit sequencer (e.g., can operate pseudo-randomly) that produces the selection bits 706 using at least one pseudo-random value. At least one pseudo-random number (PRN) can be generated by the first bus training logic 112-1, including by the bit sequencer 646, or by another component of the first die 110-1. The PRN can also be generated or seeded in an alternative manner.

The PRN can be used to select one or more first bits from the first detected bits 704-1 and one or more second bits from the second detected bits 704-2. For example, the bit sequencer 646 can choose how many bits from each group of detected bits 704 are to be selected based on the PRN. For instance, if each of the detected bits 704 have a quantity of 12, the PRN can indicate whether the split between two dice is to be 6 and 6 bits, 4 and 8 bits, 3 and 9 bits, and so forth. Additionally or alternatively, the bit sequencer 646 can use the PRN to determine which bits from each group of detected bits are to be selected. For instance, if each of the detected bits 704 have a quantity of five, a value of the PRN for a current clock cycle may determine that bit positions 1, 2, and 4 of the five bits of the first detected bits 704-1 and that bit positions 3 and 5 of the five bits of the second detected bits 704-2 are selected for inclusion in the feedback bits 708.

Thus, the selection bits 706 can at least partially control production of the feedback bits 708. The bit sequencer 646 may, however, use one or more pseudo-random values differently to produce the selection bits 706, which bit-values at least partially control operation of the multiplexer 604 to produce the feedback bits 708. Examples of bit selections, bit combinations, timing parameters or delays, bit test patterns, and bit feedback patterns are described next with reference to FIG. 8 and Table 1.

Figure 8:
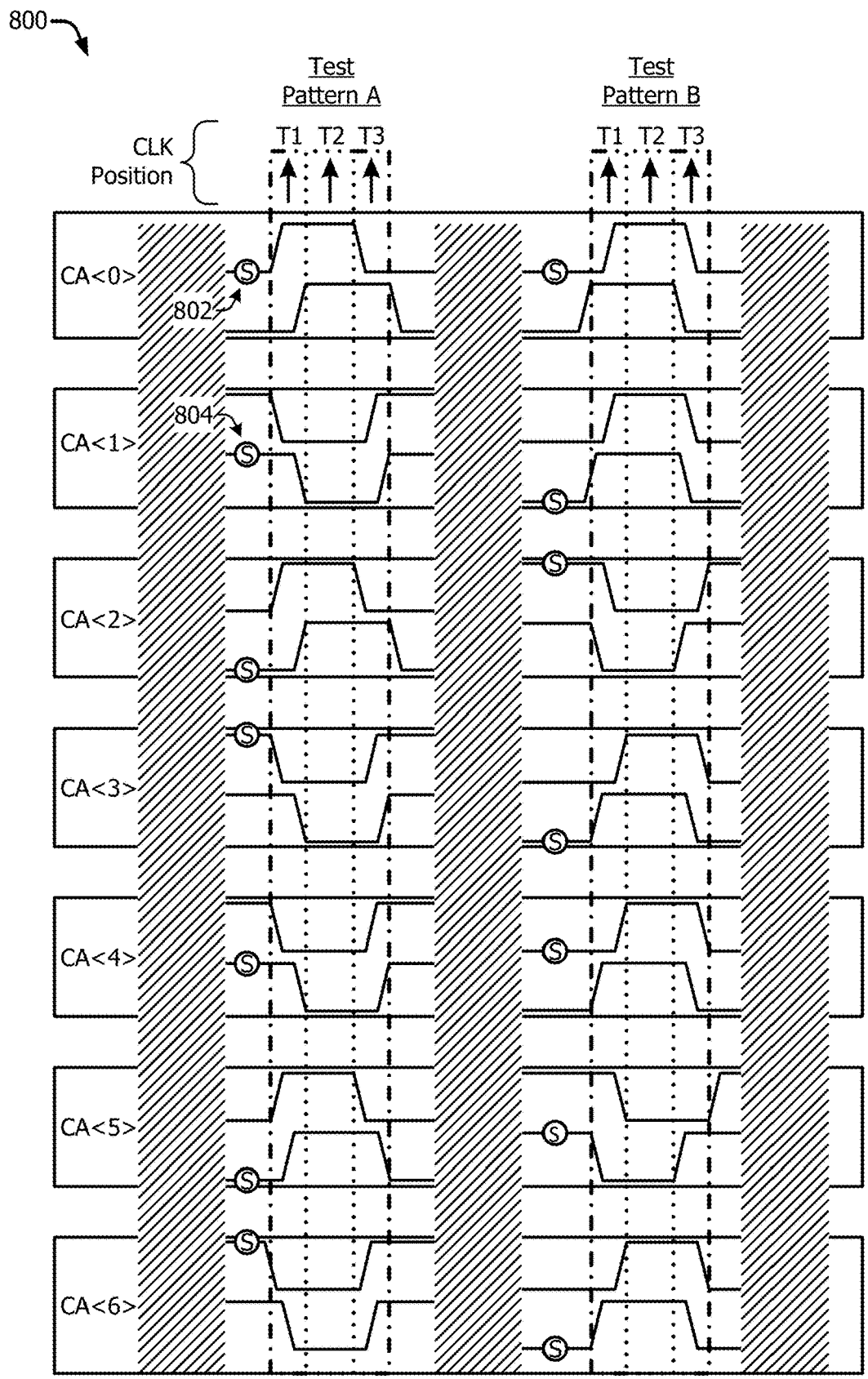
FIG. 8 illustrates multiple example test patterns for bus training in which different bit-detection timing parameters are depicted in conjunction with a selection of detected bits from two memory dice.

FIG. 8 illustrates a diagram 800 that includes multiple example test patterns for bus training in which different bit-detection timing parameters are depicted in conjunction with a selection of detected bits from two memory dice. In this example, a command and address (CA) bus with seven (7) bits is being trained. The diagram 800 therefore includes seven rows, one for each bit: CA<0>, CA<1>, CA<2>, CA<3>, CA<4>, CA<5>, and CA<6>. Nonetheless, the described principles are applicable to other bus types and to buses with a different quantity of bits. Two example test patterns are depicted across two columns: test pattern "A" and test pattern "B." Each of the different bit patterns is applied across at least three time offsets or delays for the clock signal: T1, T2, and T3. The described principles are, however, applicable to more or fewer test patterns, different test patterns, and more or fewer time delays.

The diagram 800 is described with reference to Table 1. Examples of bit patterns, such as test patterns and feedback (FB) patterns, that can be exchanged between a memory controller and a memory device are presented below in Table 1.

TABLE 1

Examples of test bit patterns and combined
feedback bit patterns for multiple dice.

| Time Index | Pattern A | | Pattern B | |
|---|---|---|---|---|
| Test Pattern | LHLLHLH | Result | HLHHLHH | Result |
| FB Pattern: T1 | LX<u>H</u>LL<u>HH</u> | NOT Matched | HLL<u>H</u>X<u>H</u>X | NOT Matched |
| FB Pattern: T2 | LHLLHLH | Matched | HLHHLHH | Matched |
| FB Pattern: T3 | <u>HH</u>LXH<u>LL</u> | NOT Matched | X<u>HH</u>XL<u>X</u>X | NOT Matched |

As shown in the diagram 800 and presented in Table 1, the test pattern "A" is LHLLHLH, and the test pattern "B" is HLHHLHH. The "H" represents a high voltage (or current), and the "L" represents a low voltage (or current). The test patterns are listed in descending order from left to right of CA<6> to CA<0>. In FIG. 8, for each row or CA bit, there are two signals per test pattern. An upper signal corresponds to the test pattern signal as received by one die, and a lower signal corresponds to the test pattern signal as received by another die.

In the diagram 800, a selected bit is indicated at the intersection of each CA bit row and test pattern column by an encircled "S." Thus, for the CA<2> bit and test pattern "B," the upper signal is selected for inclusion in the feedback bits instead of the lower signal. For the CA<5> bit and test pattern "A," the lower signal is selected for inclusion in the feedback bits instead of the upper signal. As described herein, the selection of the received signal or the detected bit may be made by the multiplexer 604 responsive to a selection indication signal 648, which may be based on a pseudo-random value. In some cases, with two dice and seven bits on the CA bus, a quantity of selected detected bits can alternate between the two dice at three bits and four bits apiece.

In Table 1 above, the three rows correspond to the three example time indices T1, T2, and T3. Each row includes a feedback pattern generated at the memory device and an associated result (e.g., "Matched" or "NOT Matched") respectively for each of the test patterns "A" and "B." The feedback pattern includes a combination of bits from the detected bits of the "same" signal as received differently by the two dice. In Table 1, the feedback pattern is coded as follows. A non-emphasized, standard letter (e.g., "L" or "H") indicates that the corresponding bit of the feedback pattern matches the test pattern. An underlined letter (e.g., "L" or "H") indicates that the corresponding bit of the feedback pattern does not match the test pattern. A bolded "X" character (e.g., "X") indicates that the corresponding bit of the feedback pattern is undetermined, such as if the signal is "detected" during a transition point.

The following specific examples pertain to the feedback pattern for the test pattern "A" at time T1. This "FB Pattern: T1" is "LX<u>H</u>LL<u>HH</u>," which does not match the test pattern "A." Consider the CA<0> bit for test pattern "A" at time T1 at 802 in the diagram 800. This bit is indicated by the "H" character on the far right of the feedback pattern in Table 1. As indicated by the encircled "S," the upper signal is selected for the feedback pattern for test pattern "A." With this T1 timing parameter, the upper signal correctly detects a high "H" voltage level that matches with the corresponding bit of the test pattern.

Consider the CA<1> bit for test pattern "A" at time T1 at 804 in the diagram 800. This bit is indicated by the "<u>H</u>" character one space from the far right of the feedback pattern in Table 1 for "FB Pattern: T1." As indicated by the encircled "S," the lower signal is selected for inclusion in the feedback pattern. With this T1 timing parameter, the lower signal incorrectly detects a high "H" voltage level while the correct voltage level that is intended to be transmitted for this bit of the test pattern is a low voltage level.

The other bits of the feedback patterns can be similarly determined to decode Table 1. As indicated in Table 1 by the upper row for time offset T1 and the lower row for time offset T3, the feedback patterns for these two time offsets do not match the corresponding test patterns. In contrast, as indicated by the middle row for time offset T2, the feedback patterns for this time offset do match the corresponding test patterns "A" and "B." Accordingly, the bus training logic 124 of a memory controller 504 can command the bus training logic 112 of the memory (and/or general mode register logic) to establish a timing parameter corresponding to the time offset T2. Examples of processes and signal timings for bus training (BT), such as command bus training (CBT), are described next with reference to FIGS. 9, 10-1, 10-2, 11-1, and 11-2.

Figure 9:
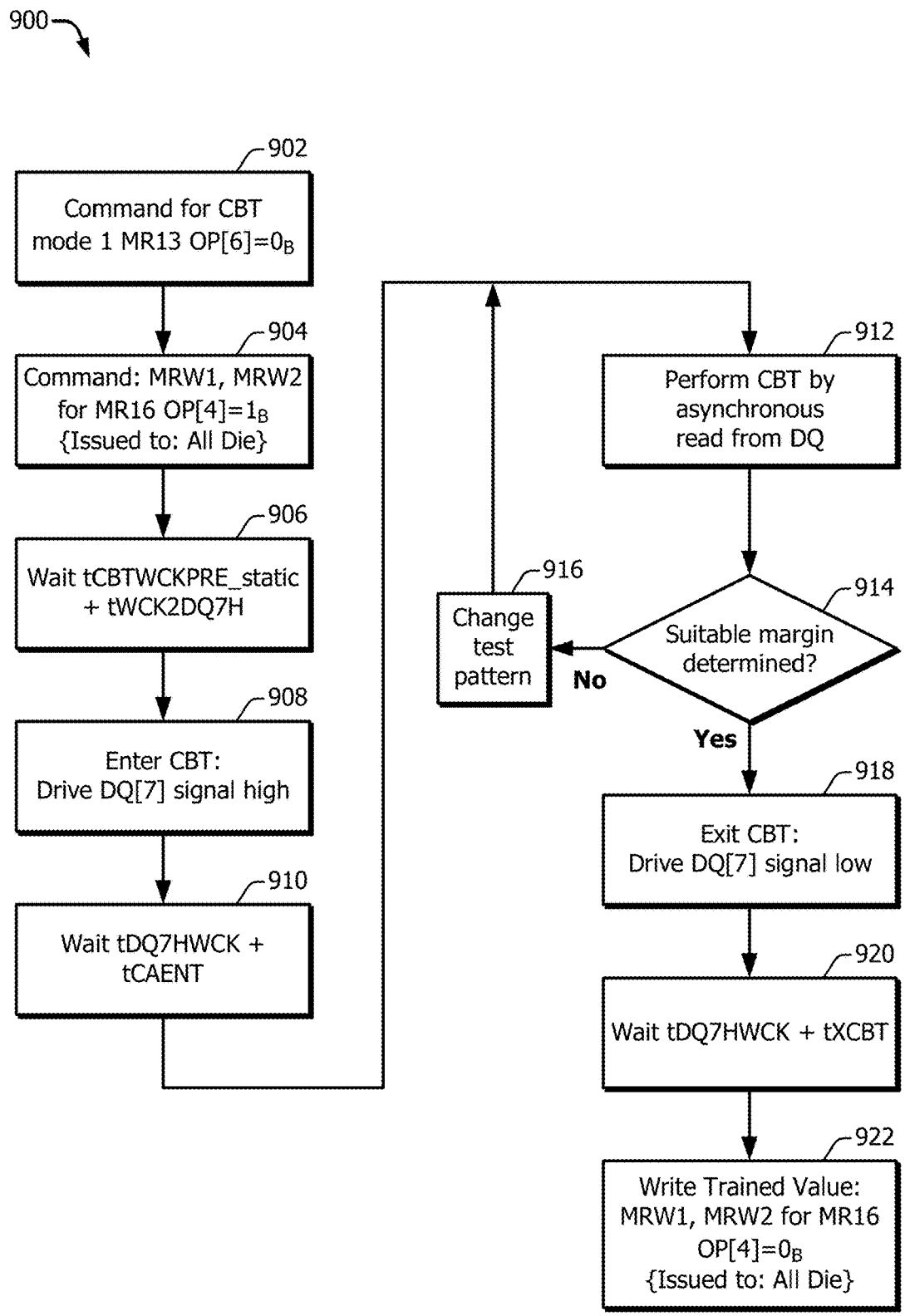
FIG. 9 illustrates a flow chart for example methods for performing a bus training procedure by a controller.

FIG. 9 illustrates a flow chart for example methods 900 for performing a bus training procedure by a controller, such as a controller 118 (of FIG. 1), a memory controller 408 (of FIG. 4), or a memory controller 504 (of FIG. 5). By way of example but not limitation, the flow chart is directed to command bus training (CBT) for an LPDDR5-compatible memory. Nonetheless, the principles are applicable to bus training generally and/or to memories that are compatible with other standards. The example buses, bits, and times that are referenced by the flow chart of FIG. 9 are further described and/or depicted in FIGS. 10-1, 10-2, 11-1, and 11-2.

At 902, the controller issues a command to enter CBT mode 1 (or mode 2) with MR13 OP[6]=$0_B$ ($1_B$ for mode 2). At 904, the controller issues at least one command with MRW1, MRW2 for MR16 OP[4]=$1_B$. This command can be issued to all dice that are coupled to the bus being trained. At 906, the controller waits for the following two time periods to transpire: tCBTWCKPRE_static+tWCK2DQ7H. Examples of these time periods are depicted relative to the DQ[7] bits in FIG. 10-1.

At 908, the controller causes the target dice to enter CBT by driving the signal (or multiple bit signals) of the DQ[7] bits high. For a x16 bus or memory configuration, the DQ[7] bits and the DQ[15] bits are driven from low to high to enter the CBT mode. At 910, the controller waits for the following two time periods to transpire: tDQ7HWCK+tCAENT. Examples of these time periods are depicted relative to the DQ[7] bits in FIG. 10-1. At 912, the controller performs operations for the CBT by transmitting a test pattern on the CA bus and then asynchronously reading from the DQ bus the corresponding responsive feedback pattern.

At 914, the controller can ascertain if a suitable timing margin (e.g., an optimal timing margin or one within specified or targeted parameters) has been determined. For example, the controller can compare the test pattern read from the DQ bus to the feedback pattern transmitted on the CA bus to determine if the two match. If not, then at 916, the controller can change the test pattern and/or the timing delay and then repeat the test pattern transmission and the feedback pattern reception operations by continuing the process at 912. If, on the other hand, a suitable margin has been ascertained, then at 918, the controller can cause the target dice to exit the CBT mode by driving the DQ[7] signal low.

At 920, the controller waits for the following two time periods to transpire: tDQ7HWCK+tXCBT. Examples of these time periods are depicted relative to the DQ[7] bits in FIG. 11-1 with regard to exiting a CBT mode. At 922, the controller commands the target dice to write a trained timing parameter value with MRW1, MRW2 for MR16 OP[4]=$0_B$. This command may be issued to all dice that are coupled to the bus being trained.

Examples of signaling between a memory controller and a memory device for a CBT procedure, which may correspond to the methods 900 of the flow chart in FIG. 9, are presented below in Table 2.

TABLE 2

Examples of a Bus Training Procedure.

| Bus Training Stage | Signal Activity | Operation |
| --- | --- | --- |
| Pre-Command Bus Training (CBT) | N/A | Die masking mode obviated |
| CBT | MRW13 OP[6] | CBT Mode (1 or 2) |
|  | MRW16 OP[4] = $1_B$ | No FSP, CBT enabled |
|  | MRW16 OP[6] | VRCG |
|  | MRW16 OP[7] | CBT-Phase |
|  | DQ7 (DQ15) to H CBT-process | Memory device returns combined bits as a feedback pattern to memory controller. |
|  | DQ7 (DQ15) to L |  |
| Post-CBT | MRW16 OP[4] = $0_B$ | Normal Operation Mode |

Figures 1, 10:
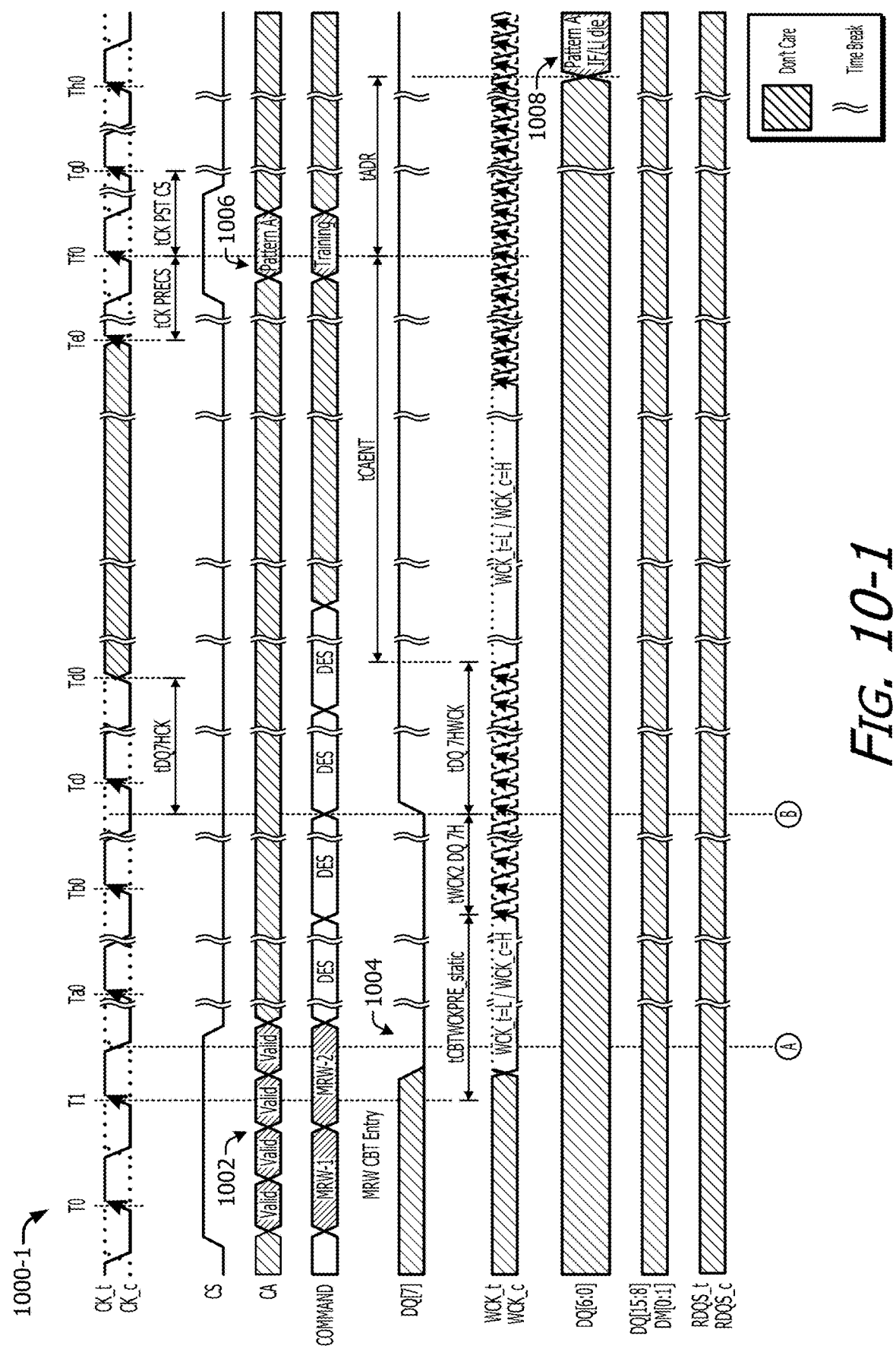
Figures 2, 10:
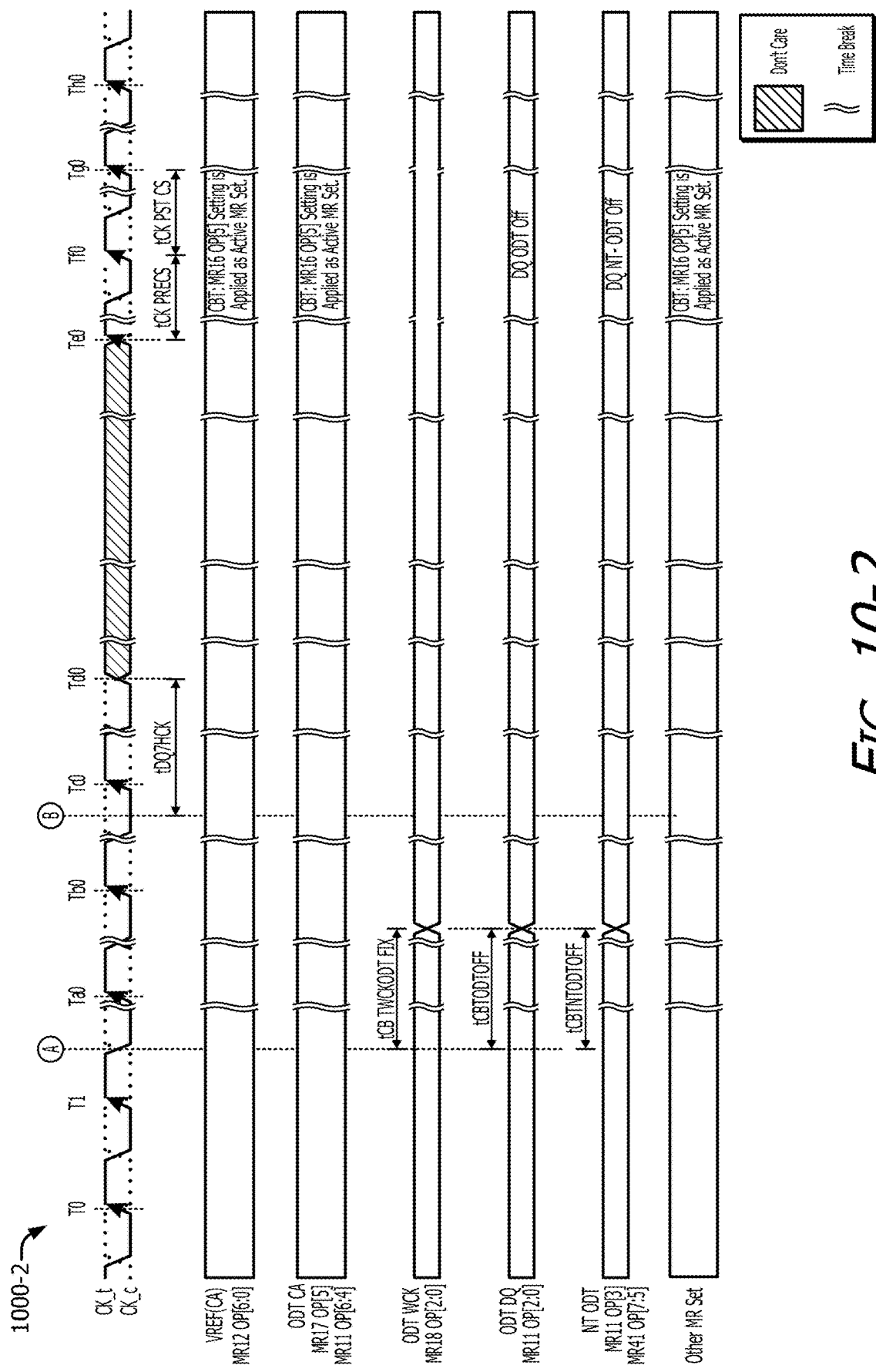

FIGS. 10-1 and 10-2 jointly illustrate an example timing diagram at 1000-1 and 1000-2 for entering a bus training mode. The timing diagram includes, for example, a CA bus, a command indication row (COMMAND), the DQ[7] bits under the control of a memory controller, and the DQ[6:0] bus under the control of the memory device. The timing diagram 1000-1 depicts, for instance, the mode register writes 1 and 2 at 1002 for MRW CBT entry. The timing diagram 1000-1 also depicts the driving low of the DQ[7] bits by the memory controller at 1004.

At 1006, the memory controller transmits a pattern "A" to the memory device over the CA bus. As described herein, bus training logic 112 (e.g., of FIGS. 1, 2, 4, 5, 6-1, 6-2, and 7) of the memory device produces a feedback pattern version of the test pattern "A," with the feedback pattern including a combination of bits detected by two or more dice. In an environment in which an interface die (IF) and a linked die (Li) are present, logic of the interface die can combine selected bits that are detected by each of the interface and linked dice to produce the combined feedback pattern. At 1008, the interface die transmits the combined feedback bits for the pattern "A" on the DQ[6:0] bus to the memory controller.

Figures 1, 11:
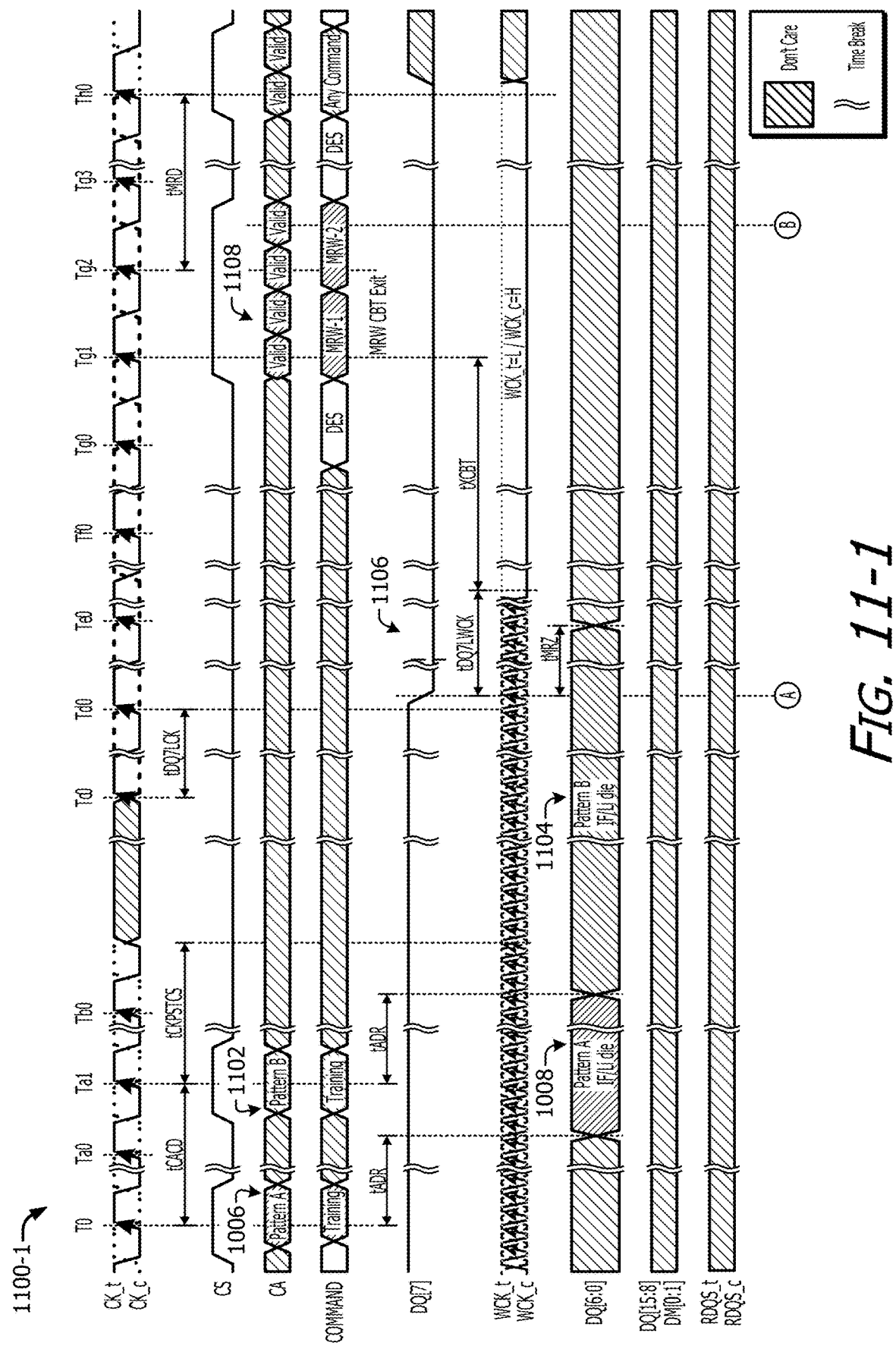
Figures 2, 11:
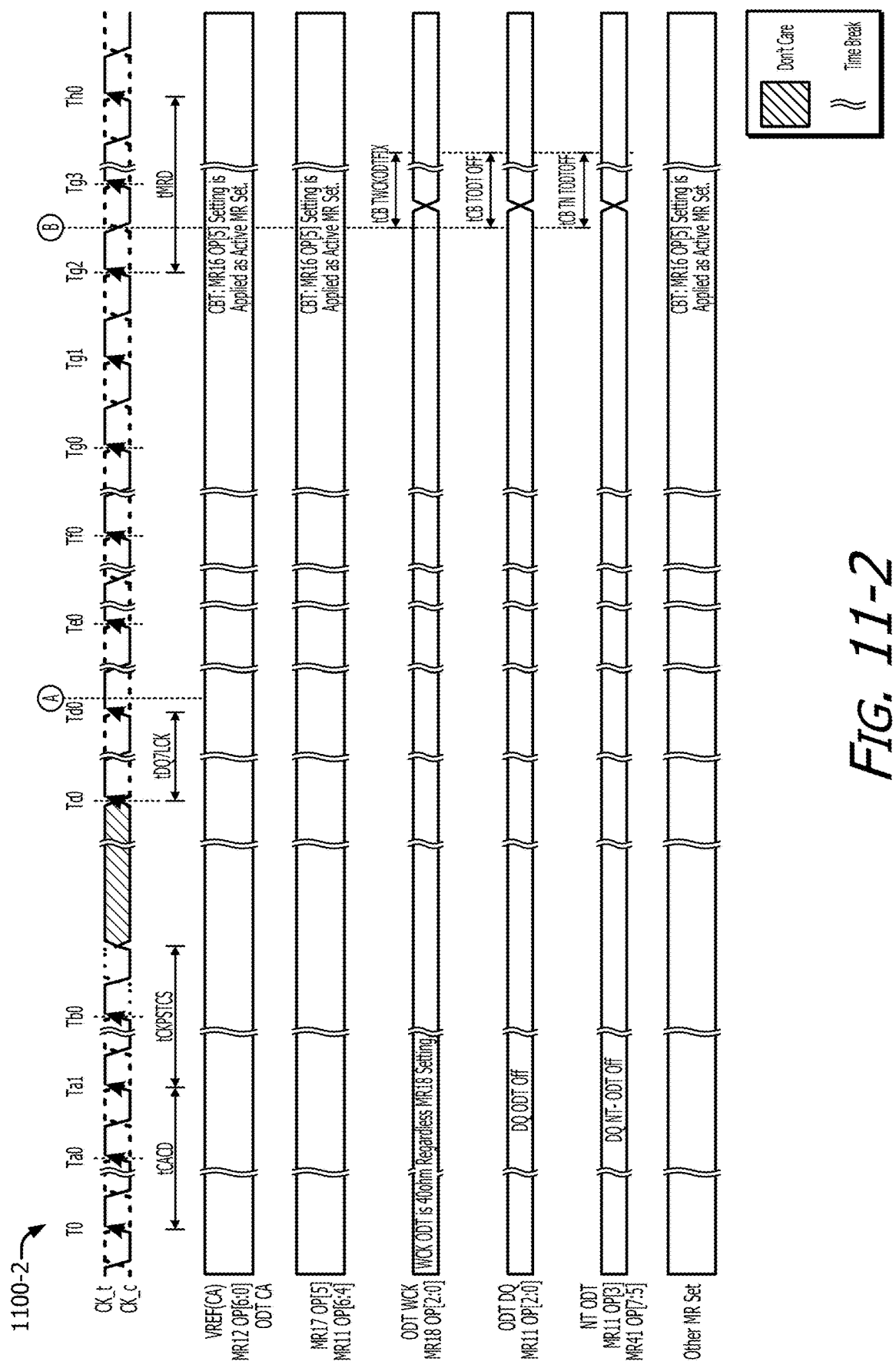

FIGS. 11-1 and 11-2 jointly illustrate an example timing diagram 1100-1 and 1100-2 for exiting a bus training mode. As also shown in FIG. 10-1, the communication of the test pattern "A" is indicated at 1006, and the return communication of the feedback pattern "A" is indicated at 1008. At 1102, the memory controller transmits a test pattern "B" to the memory device over the CA bus, and the memory device receives the pattern "B." The memory device detects the bits of the pattern "B" based on some timing parameter across multiple dice.

After combining detected bits as selected from individual ones of the multiple dice, the memory device produces combined feedback bits. At 1104, the interface die transmits the combined feedback bits for the pattern "B" over the DQ[6:0] bus to the memory controller. Further, the memory controller receives the combined feedback bits via the DQ[6:0] bus. The timing diagram 1100-1 additionally depicts, for example, the driving low of the DQ[7] bits by the memory controller at 1106. After expiration of two time periods (tDQ7LWCK and tXCBT), the memory controller issues the mode register writes 1 and 2 at 1108 for the MRW CBT exit. Although specific aspects of example implementations are depicted in the timing diagrams and described above, other implementations may deviate from these timing diagrams.

Particular circuit implementations and hardware environments have been illustrated in the accompanying figures and described above. Nonetheless, the principles described with reference to FIGS. 5 to 11-2, as well as the other figures, are applicable to other types of memory devices, communication exchanges, and/or environments. Although certain concepts are described herein in the context of LPDDR5 SDRAM, the described techniques can be applied to other memory device types or standards and/or to non-memory dice. Also, although certain concepts are described herein in the context of CXL Type 3 devices ("Memory Expanders"), the described techniques can be applied to other CXL device types and/or to non-CXL devices.

Example Methods

Figure 12:
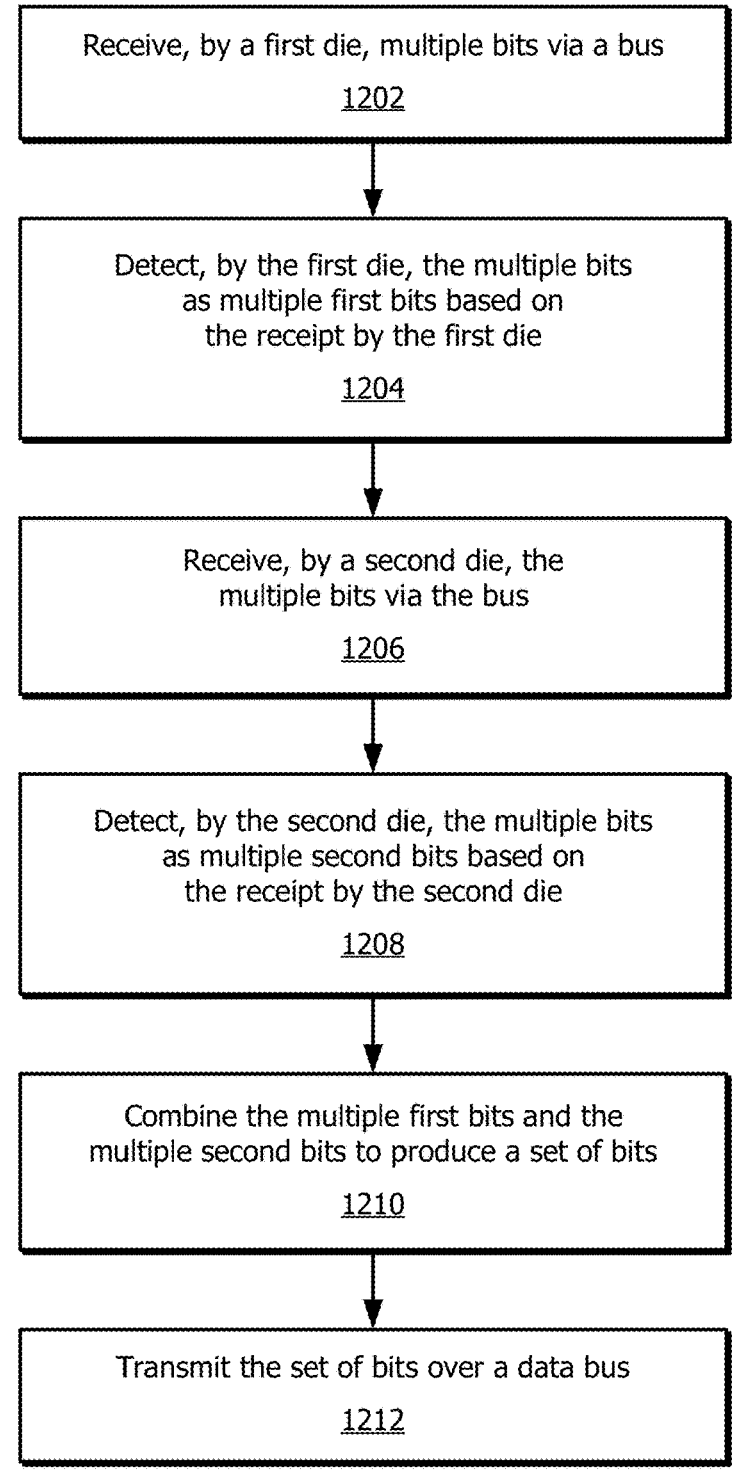
FIG. 12 illustrates a flow diagram for example processes that implement aspects of bus training with interconnected dice.
Figure 13:
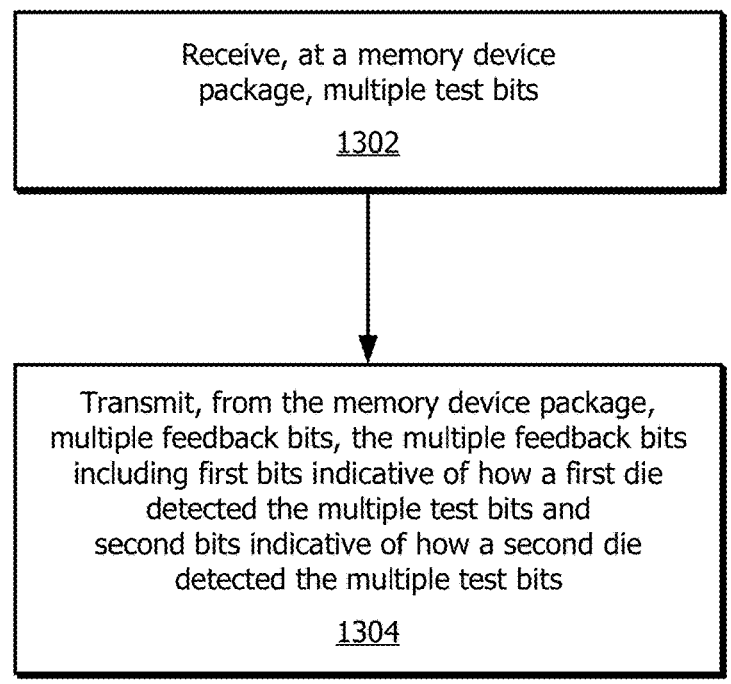
FIG. 13 illustrates a flow diagram for other example processes that implement aspects of bus training with interconnected dice.

This section describes example methods with reference to the flow chart(s) and flow diagram(s) of FIGS. 12 and 13 for implementing aspects of bus training with interconnected dice. These descriptions may also refer to components, entities, and other aspects depicted in FIGS. 1 to 11-2, which reference is made only by way of example.

The processes 1200 of FIG. 12 and the processes 1300 of FIG. 13 may be performed by, for example, a memory device 108, a memory module 302, a DRAM 410, a memory package 502, bus training logic 112, some combination thereof, and so forth. In a memory environment, for instance, the communications may be accomplished across a command bus and a data bus that are coupled between a memory device and a host device or memory controller. Although the operations are described with reference to components of a memory environment, the operations may be performed by circuitry that is not necessarily directed to memory but that implements bus training.

FIG. 12 illustrates a flow diagram for example processes 1200 that implement aspects of bus training with interconnected dice. The processes 1200 can include blocks 1202 to 1212. At block 1202, a first die receives multiple bits via a bus. For example, a first die 110-1 can receive multiple bits 608 via a bus. For instance, a first receiver 602-1 of the first die 110-1 may receive the multiple bits 608 from a command bus 120, with the multiple bits 608 corresponding to a test pattern for a bus training procedure.

At block 1204, the first die detects the multiple bits as multiple first bits based on the receiving by the first die. For example, the first die 110-1 can detect the multiple bits 608 as multiple first bits 610-1 based on the receiving by the first die 110-1. In some cases, a timing parameter may establish a delay for an edge of a clock signal 642 that controls a timing of when the first receiver 602-1 latches a current value of a signal that carries the multiple bits 608 to obtain the multiple first bits 610-1.

At block 1206, a second die receives the multiple bits via the bus. For example, the second die 110-2 can receive the multiple bits 608 via the bus. To do so, a second receiver 602-1 of the second die 110-2 may receive the multiple bits 608 from the "same" command bus 120.

At block 1208, the second die detects the multiple bits as multiple second bits based on the receiving by the second die. For example, the second die 110-2 can detect the multiple bits 608 as multiple second bits 610-2 based on the receiving by the second die 110-2. Here, the timing parameter may establish a same delay for an edge of the clock signal 642 that controls a timing of when the second receiver 602-2 latches a current value of the signal that carries the multiple bits 608 to obtain the multiple second bits 610-2. Further, the second die 110-2 may transmit the multiple second bits 610-2 to bus training logic 112.

At block 1210, the multiple first bits and the multiple second bits are combined to produce a set of bits. For example, the bus training logic 112 can combine the multiple first bits 610-1 and the multiple second bits 610-2 to produce a set of bits 612. The bus training logic 112 may be present at the first die 110-1. If so, the first die 110-1 may combine one or more selected bits from the multiple first bits 610-1 and one or more selected bits from the multiple second bits 610-2 to produce the set of bits 612 as a feedback pattern.

At block 1212, the set of bits is transmitted over a data bus. For example, the bus training logic 112 can transmit the set of bits 612 over a data bus 122. This may be performed by a transmitter 606-1 of the first die 110-1, and the transmitter 606-1 may transmit the set of bits 612 to bus training logic 124 at a controller.

FIG. 13 illustrates a flow diagram for other example processes 1300 that implement aspects of bus training with interconnected dice. The processes 1300 can include blocks 1302 and 1304. At block 1302, a memory device package receives multiple test bits. For example, a memory device package 502 can receive multiple test bits 702 as at least part of a test pattern 508. For instance, a first die 110-1 may receive the multiple test bits 702 via a first bus and obtain first detected bits 704-1 based on the received multiple test bits 702 and at least one timing parameter, which may be realized with a clock signal 642 having a first timing. Similarly, a second die 110-2 may receive the multiple test bits 702 via the first bus and obtain second detected bits 704-2 based on the received multiple test bits 702 and the at least one timing parameter, which may be realized with the clock signal 642 having a second timing.

At block 1304, the memory device package transmits multiple feedback bits, with the multiple feedback bits including first bits indicative of how a first die detected the multiple test bits and second bits indicative of how a second die detected the multiple test bits. For example, the memory device package 502 can transmit multiple feedback bits 708 as at least part of a feedback pattern 512. Here, the multiple feedback bits 708 can include first bits (e.g., the first detected bits 704-1) indicative of how the first die 110-1 detected the multiple test bits 702 and second bits (e.g., the second detected bits 704-2) indicative of how the second die 110-2 detected the multiple test bits 702.

In some cases, the memory device package 502 may transmit, from the first die 110-1, the multiple feedback bits 708 together substantially in parallel over another bus that is external to the memory device package 502. Further, the memory device package 502 may perform a bus training procedure by repeating the receiving and the transmitting for different values of the multiple test bits 702 and for different timings of the clock signal 642 that triggers detection of the multiple test bits 702.

For the flow chart(s) and flow diagram(s) described above, the orders in which operations are shown and/or described are not intended to be construed as a limitation. Any number or combination of the described process operations can be combined or rearranged in any order to implement a given method or an alternative method. Operations may also be omitted from or added to the described methods. Further, described operations can be implemented in fully or partially overlapping manners.

Aspects of these methods may be implemented in, for example, hardware (e.g., fixed-logic circuitry or a processor in conjunction with a memory), firmware, software, or some combination thereof. The methods may be realized using one or more of the apparatuses, components, or other aspects shown in FIGS. 1 to 7, the components or aspects of which may be further divided, combined, rearranged, and so on. The devices and components of these figures generally represent hardware, such as electronic devices, packaged modules, IC chips, or circuits; firmware or the actions thereof; software; or a combination thereof. Thus, these figures illustrate some of the many possible systems or apparatuses capable of implementing the described methods.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Also, as used herein, a phrase referring to "at least one of" a list of items refers to any combination of those items, including single members. For instance, "at least one of a, b, or c" can cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c, or any other ordering of a, b, and c). Further, items represented in the accompanying figures and terms discussed herein may be indicative of one or more items or terms, and thus reference may be made interchangeably to single or plural forms of the items and terms in this written description.

CONCLUSION

Although implementations for bus training with interconnected dice have been described in language specific to certain features and/or methods, the subject of the appended claims is not necessarily limited to the specific features or methods described. Rather, the specific features and methods are disclosed as example implementations for bus training with interconnected dice.

What is claimed is:

1. A method comprising:
receiving, by a first die of a memory package, multiple bits via a bus;
detecting, by the first die, the multiple bits as multiple first bits based on the receiving by the first die;
receiving, by a second die of the memory package, the multiple bits via the bus;
detecting, by the second die, the multiple bits as multiple second bits based on the receiving by the second die;
combining, at the memory package, the multiple first bits and the multiple second bits to produce a set of bits; and
transmitting, from the memory package to a memory controller, the set of bits over a data bus.

2. The method of claim 1, further comprising:
transmitting, by the second die, the multiple second bits to the first die via a second data bus.

3. The method of claim 1, further comprising:
performing a bus training procedure with the memory controller by repeating at least the combining and the transmitting with different bit patterns as the multiple bits.

4. The method of claim 1, further comprising:
receiving signaling indicative of an instruction to perform a bus training procedure,
wherein at least the combining and the transmitting are performed responsive to the signaling.

5. The method of claim 4, further comprising:
receiving a command to write a value in a mode register, the value indicative of the bus training procedure; and
writing the value in the mode register prior to the combining.

6. The method of claim 1, further comprising:
pseudo-randomly selecting, by logic at the memory package, a portion of the multiple first bits and a portion of the multiple second bits to include in the set of bits.

7. The method of claim 6, further comprising:
selecting, by the logic at the memory package, three bits of seven bits from the multiple first bits;
selecting, by the logic at the memory package, four bits of seven other bits from the multiple second bits; and
combining, by the logic at the memory package, the three bits and the four bits to form the set of bits.

8. The method of claim 1, further comprising:
detecting, by the first die, the multiple bits as the multiple first bits responsive to a clock signal having a first timing;
receiving, by the first die, signaling indicative of a second timing for the clock signal;
receiving, by the first die, multiple other bits via the bus; and
detecting, by the first die, the multiple other bits as multiple other first bits responsive to the clock signal having the second timing.

9. The method of claim 1, further comprising:
transmitting, by the first die from the memory package, the set of bits over the data bus to the memory controller, the memory controller included as part of a memory device that includes the first die and the second die; and
communicating, by the memory device, over an interconnect in accordance with at least one version of a Compute Express Link™ (CXL) protocol.

10. An apparatus comprising:
a memory package comprising:
a first die including a first receiver, the first receiver configured to be coupled to a bus and to detect multiple bits received via the bus as multiple first bits;
a second die including a second receiver, the second receiver configured to be coupled to the bus and to detect the multiple bits received via the bus as multiple second bits; and
logic configured to:
combine the multiple first bits and the multiple second bits to produce a set of bits; and
transmit the set of bits over a data bus to a memory controller.

11. The apparatus of claim 10, wherein:
the second die includes second logic configured to transmit the multiple second bits over a second data bus; and
the first die includes first logic configured to receive the multiple second bits via the second data bus.

12. The apparatus of claim 11, wherein:
the first die includes the logic; and
the first logic is configured to forward the multiple second bits to the logic.

13. The apparatus of claim 11, wherein:
the memory package comprises the second data bus; and
the first die and the second die are configured to enable the second die to transmit data over the data bus and to receive data via the data bus using the second data bus.

14. The apparatus of claim 10, wherein the first die is configured to access the data bus using the second die.

15. The apparatus of claim 10,
wherein the first die and the second die are packaged together in the memory package in a stacked-die architecture.

16. The apparatus of claim 10, wherein:
the first die comprises an interface die; and
the second die comprises a linked die.

17. The apparatus of claim 10, wherein the bus comprises a command bus.

18. The apparatus of claim 17, wherein the command bus comprises a command and address bus (CA bus).

19. The apparatus of claim 10, wherein:
the first die includes first logic configured to:
receive signaling indicative of a timing parameter for a receiving operation performed by the first receiver; and
detect the multiple bits received via the bus as the multiple first bits in accordance with the timing parameter; and
the second die includes second logic configured to:
receive signaling indicative of the timing parameter for a receiving operation performed by the second receiver; and
detect the multiple bits received via the bus as the multiple second bits in accordance with the timing parameter.

20. The apparatus of claim 19, wherein the timing parameter relates to at least one clock signal that controls, at least partially, a timing by the first receiver or the second receiver of the detection of the multiple bits on the bus.

21. The apparatus of claim 20, wherein:
the first receiver is configured to detect the multiple bits on the bus responsive to the at least one clock signal having an edge that occurs at least partially based on the timing parameter; and the second receiver is configured to detect the multiple bits on the bus responsive to the at least one clock signal having an edge that occurs at least partially based on the timing parameter.

22. The apparatus of claim 10, wherein the logic is configured to:
exclude at least one bit of the multiple first bits to produce the set of bits with the combination of the multiple first bits and the multiple second bits.

23. The apparatus of claim 22, wherein the logic is configured to:
exclude at least one bit of the multiple second bits to produce the set of bits with the combination of the multiple first bits and the multiple second bits.

24. The apparatus of claim 10, wherein:
the multiple first bits comprise a quantity of bits;
the multiple second bits comprise the quantity of bits; and
the logic is configured to combine at least one bit of the multiple first bits and at least one bit of the multiple second bits to produce the set of bits, the set of bits comprising the quantity of bits.

25. The apparatus of claim 10, wherein the logic is configured to:
select a first set of bits from the multiple first bits;
select a second set of bits from the multiple second bits; and
combine the first set of bits and the second set of bits to produce the set of bits.

26. The apparatus of claim 25, wherein the logic is configured to:
select the first set of bits from the multiple first bits based on at least one value; and
select the second set of bits from the multiple second bits based on the at least one value.

27. The apparatus of claim 26, wherein the at least one value includes bits that are generated, at least partially, using a pseudo-random number mechanism.

28. The apparatus of claim 10, wherein:
the memory package comprises an integrated circuit package including the first die and the second die.

29. The apparatus of claim 28, wherein:
the first die includes a first memory array; and
the second die includes a second memory array.

30. The apparatus of claim 29, wherein the first memory array comprises at least one of:
a dynamic random-access memory (DRAM) array; or
a nonvolatile memory array.

31. The apparatus of claim 10, further comprising:
second logic including a memory controller configured to:
transmit the multiple bits over the bus to the memory package; and
receive the set of bits via the data bus from the logic of the memory package.

32. The apparatus of claim 31, wherein the apparatus comprises a Compute Express Link™ (CXL) memory device.

33. The apparatus of claim 32, wherein the CXL memory device comprises a Type 3 CXL memory device.

34. An apparatus comprising:
a memory package comprising:
a second die including a second receiver, the second receiver configured to be coupled to a bus and to detect multiple bits received via the bus as multiple second bits; and
a first die including:
a first receiver, the first receiver configured to be coupled to the bus and to detect the multiple bits received via the bus as multiple first bits;
a multiplexer coupled to the first receiver and the second die; and
logic coupled to the multiplexer, the logic configured to:
combine the multiple first bits and the multiple second bits to produce a set of bits using the multiplexer; and
transmit the set of bits over a data bus to a memory controller.

35. The apparatus of claim 34, wherein the logic comprises:
a bit sequencer configured to select one or more first bits from the multiple first bits and one or more second bits from the multiples second bits; and
combine the one or more first bits and the one or more second bits to form the set of bits using the multiplexer.

36. The apparatus of claim 35, wherein:
the bit sequencer comprises a pseudo-random bit sequencer; and
the pseudo-random bit sequencer is configured to select the one or more first bits and the one or more second bits using at least one pseudo-random value.

37. The apparatus of claim 34, wherein the memory package comprises:
a second data bus coupled between the first die and the second die.

38. The apparatus of claim 37, wherein:
the first die includes another first receiver that is coupled to the second data bus and the multiplexer; and
the second die includes a second transmitter that is coupled to the second data bus, the second transmitter configured to transmit the multiple second bits over the second data bus to the other first receiver of the first die.

39. A method comprising:
receiving, via a first bus at a first die of a memory device package, multiple test bits as multiple first test bits;
receiving, via the first bus at a second die of the memory device package, the multiple test bits as multiple second test bits;
producing, at the memory device package, multiple feedback bits, the multiple feedback bits including first bits indicative of how the first die detected the multiple test bits and second bits indicative of how the second die detected the multiple test bits, the first bits including a portion of the multiple first test bits, the second bits including a portion of the multiple second test bits, the multiple feedback bits excluding at least one bit of the multiple first test bits and at least one bit of the multiple second test bits; and
transmitting, from the memory device package over a second bus, the multiple feedback bits.

40. The method of claim 39, further comprising:
receiving, via the first bus at the first die and the second die of the memory device package, the multiple test bits responsive to a clock signal having a first timing;
receiving, via the first bus at the first die and the second die of the memory device package, multiple other test bits responsive to the clock signal having a second timing; and
transmitting, from the memory device package over the second bus, multiple other feedback bits, the multiple other feedback bits including other first bits indicative of how the first die detected the multiple other test bits and other second bits indicative of how the second die detected the multiple other test bits.

41. The method of claim 39, further comprising:
performing a bus training procedure by repeating the receiving of the multiple test bits as the multiple first test bits, the receiving of the multiple test bits as the multiple second test bits, the producing, and the transmitting for different values of the multiple test bits and for different timings of a clock signal that triggers detection of the multiple test bits.

42. The method of claim 39, further comprising:
transmitting, from the second die to the first die over a third bus that is internal to the memory device package, the second bits indicative of how the second die detected the multiple test bits.

43. The method of claim 42, further comprising:
transmitting, from the first die of the memory device package, the multiple feedback bits together substantially in parallel over the second bus, the second bus external to the memory device package.

44. An apparatus comprising:
a first bus;
first logic coupled to the first bus and including a memory controller, the memory controller configured to transmit multiple bits over the first bus;
a first die of a memory package, the first die including a first receiver coupled to the first bus, the first receiver configured to detect the multiple bits received via the first bus as multiple first bits;
a second die of the memory package, the second die including a second receiver coupled to the first bus, the second receiver configured to detect the multiple bits received via the first bus as multiple second bits; and
second logic of the memory package, the second logic coupled to the first receiver, the second receiver, and the memory controller, the second logic configured to:
combine the multiple first bits and the multiple second bits to produce a set of bits; and
transmit the set of bits from the memory package to the memory controller.

45. The apparatus of claim 44, further comprising:
a second bus coupled between the first logic and the second logic,
wherein the second logic is configured to transmit the set of bits from the memory package to the memory controller of the first logic over the second bus.

46. The apparatus of claim 45, further comprising:
a third bus of the memory package, the third bus coupled between the second die and the second logic,
wherein the second die includes a transmitter coupled to the third bus and configured to transmit the multiple second bits over the third bus to the second logic.

47. The apparatus of claim 46, wherein:
the first bus comprises a command bus;
the second bus comprises a data bus; and
the third bus comprises a second data bus.

48. The apparatus of claim 47, wherein the apparatus comports with at least one version of a Compute Express Link™ (CXL) standard.

49. The apparatus of claim 46, wherein:
the memory package comprises an integrated circuit package that includes the first die and the second die.

50. The apparatus of claim 49, wherein:
the first die includes the second logic; and
the integrated circuit package includes the third bus.

* * * * *